United States Patent
Zhang et al.

(10) Patent No.: US 12,413,379 B2
(45) Date of Patent: Sep. 9, 2025

(54) GUARD PERIOD CONFIGURATION BETWEEN SUBBAND FULL DUPLEX AND HALF DUPLEX SYMBOLS AND SLOTS

(71) Applicant: QUALCOMM Incorporated, San Diego, CA (US)

(72) Inventors: Qian Zhang, Basking Ridge, NJ (US); Yan Zhou, San Diego, CA (US); Muhammad Sayed Khairy Abdelghaffar, San Jose, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 463 days.

(21) Appl. No.: 17/895,728

(22) Filed: Aug. 25, 2022

(65) Prior Publication Data

US 2024/0072989 A1 Feb. 29, 2024

(51) Int. Cl.
*H04L 5/16* (2006.01)
*H04L 27/26* (2006.01)

(52) U.S. Cl.
CPC ............ *H04L 5/16* (2013.01); *H04L 27/2605* (2013.01)

(58) Field of Classification Search
None
See application file for complete search history.

(56) References Cited

U.S. PATENT DOCUMENTS

| | | | |
|---|---|---|---|
| 2019/0068355 A1* | 2/2019 | Ode | H04W 72/0446 |
| 2021/0176626 A1 | 6/2021 | Abdelghaffar et al. | |
| 2022/0361218 A1* | 11/2022 | He | H04L 5/0053 |
| 2023/0276386 A1* | 8/2023 | Kim | H04L 5/0064 |
| 2024/0388413 A1* | 11/2024 | You | H04L 5/0092 |

OTHER PUBLICATIONS

International Search Report and Written Opinion—PCT/US2023/072105—ISA/EPO—Dec. 11, 2023.
Qualcomm Incorporated: "Feasibility and Techniques for Subband Non-Overlapping Full Duplex", 3GPP TSG RAN WG1, Meeting #110, R1-2207231, 3rd Generation Partnership Project, Mobile Competence Centre, 650, Route Des Lucioles, F-06921 Sophia-Antipolis Cedex, France, vol. RAN WG1, No. Toulouse, Aug. 22, 2022-Aug. 26, 2022, Aug. 13, 2022, pp. 1-28, XP052275167, Sections 1-5, p. 7, Paragraph 2.5.2, p. 9, Section 3.1.2, Figures 3-2.

* cited by examiner

*Primary Examiner* — Lonnie V Sweet
(74) *Attorney, Agent, or Firm* — Patterson+ Sheridan, L.L.P.

(57) ABSTRACT

Certain aspects of the present disclosure provide techniques for guard period configuration between subband full duplex and half duplex symbols and slots. An example method that may be performed at a user equipment (UE) includes obtaining an indication of a guard period during which a cell in which the UE is communicating will switch between subband full duplex (SBFD) communications and half duplex (HD) communications; and performing one or more actions during the guard period, in accordance with the indication.

35 Claims, 20 Drawing Sheets

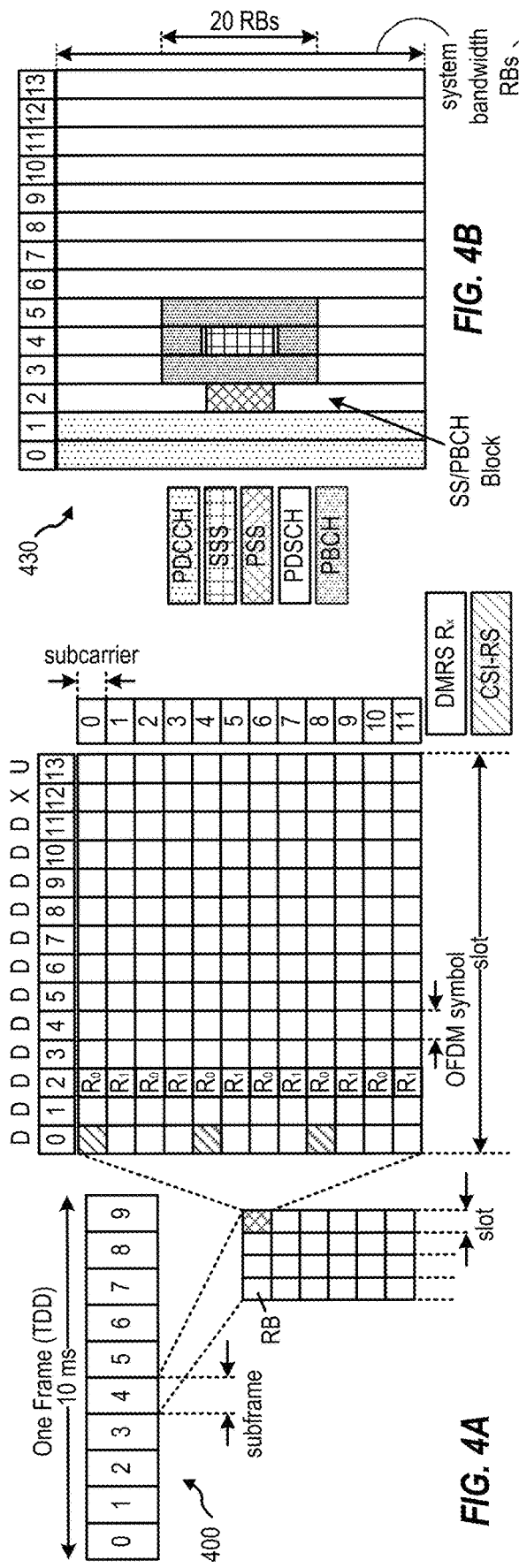
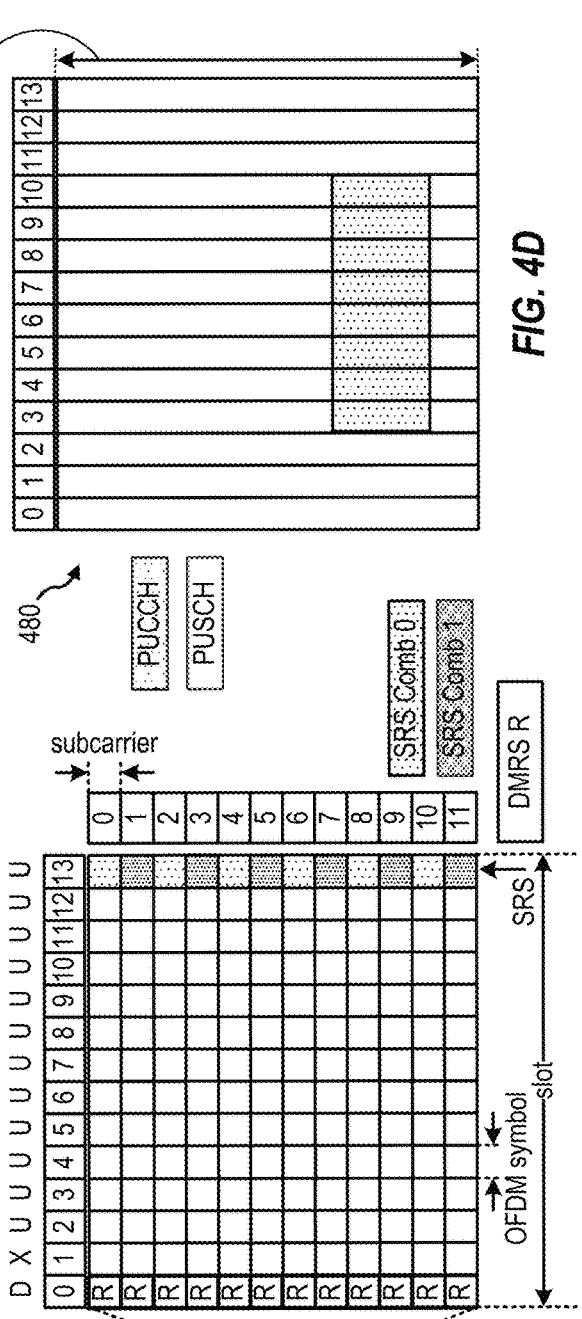
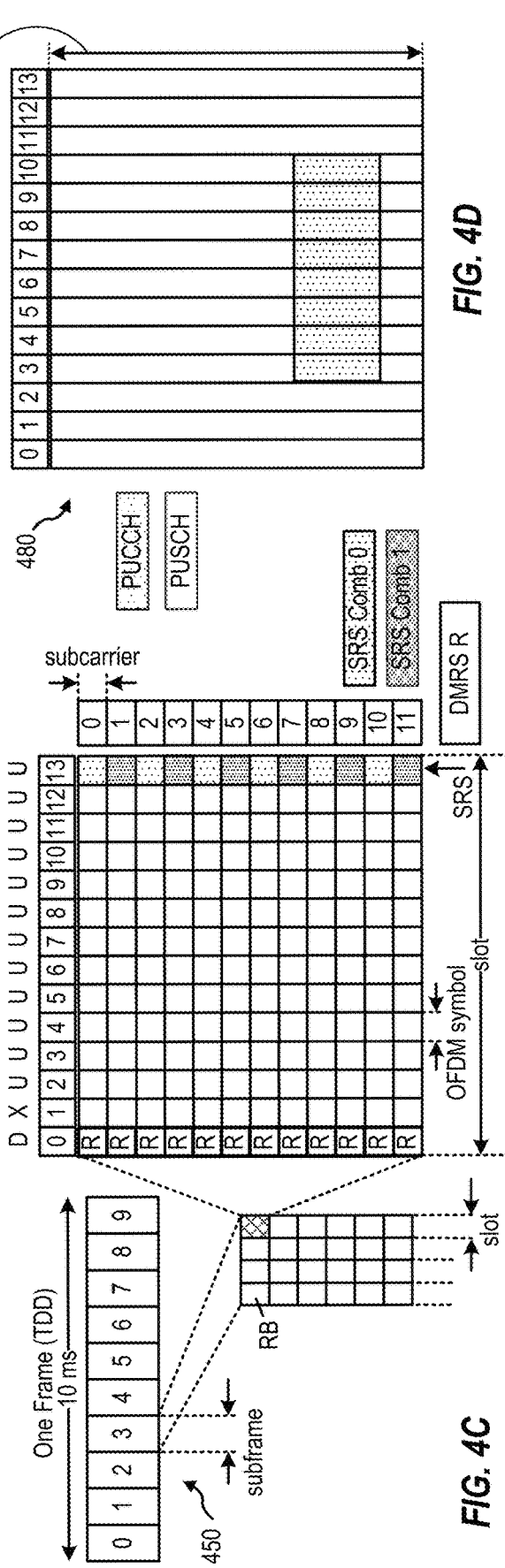

GUARD PERIOD CONFIGURATION BETWEEN SUBBAND FULL DUPLEX AND HALF DUPLEX SYMBOLS AND SLOTS

BACKGROUND

Field of the Disclosure

Aspects of the present disclosure relate to wireless communications, and more particularly, to techniques for guard period configuration between subband full duplex and half duplex symbols and slots.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a user equipment (UE). The method includes obtaining an indication of a guard period during which a cell in which the UE is communicating will switch between subband full duplex (SBFD) communications and half duplex (HD) communications; and performing one or more actions during the guard period, in accordance with the indication.

Another aspect provides a method for wireless communications at a network entity. The method includes providing an indication of a guard period during which the network entity will switch between subband full duplex (SBFD) communications and half duplex (HD) communications in a cell.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Aspects of the present disclosure provide apparatuses, methods, processing systems, and computer-readable mediums for configuring guard periods between subband full duplex and half duplex symbols and slots.

A typical user equipment (UE) in a wireless communications network cannot instantaneously switch from receiving a downlink signal in a downlink slot or symbol to transmitting an uplink signal in an uplink slot or symbol. The UE cannot typically instantaneously switch from receiving to transmitting because the UE may switch components of an RF chain and because the UE may need to change settings of components (e.g., amplifiers). Switching components and changing settings cannot typically be accomplished instantaneously. Even when a UE is configured to change from receiving to transmitting in a predetermined pattern, switching components and changing settings of components cannot accommodate changing from receiving to transmitting instantaneously. For example, a UE changing from subband full duplex (SBFD) operation to half duplex (HD) operation may apply advanced selectivity and/or adaptive filter techniques during an SBFD slot or symbol to minimize inter-UE cross-link interference (CLI) and save power. In addition, the UE UL timing and/or timing advance (TA) may differ between UL slots in HD operation and an UL subband in SBFD operation. To enable such changes between SBFD and HD communications, a UE may take some time to tune some radio frequency (RF) blocks, baseband blocks, and/or filters and to make timing adjustments.

According to aspects of the present disclosure, techniques are provided for configuring guard periods for changing between SBFD communications and HD communications. UEs may determine latencies for retuning filters, changing timing advances, and changing from receiving to transmitting. The UEs may determine guard periods based on the latencies and subcarrier spacing of an operating band of a cell. The UEs may also report the latencies and be configured with guard periods by network entities.

By configuring guard periods between SBFD communications and HD communications, UEs and network entities may more reliably communicate using SBFD communications. Ultra-reliable low latency communications (URLLC), which may use SBFD communications extensively, may especially benefit from configuring guard periods between SBFD communications and HD communications.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
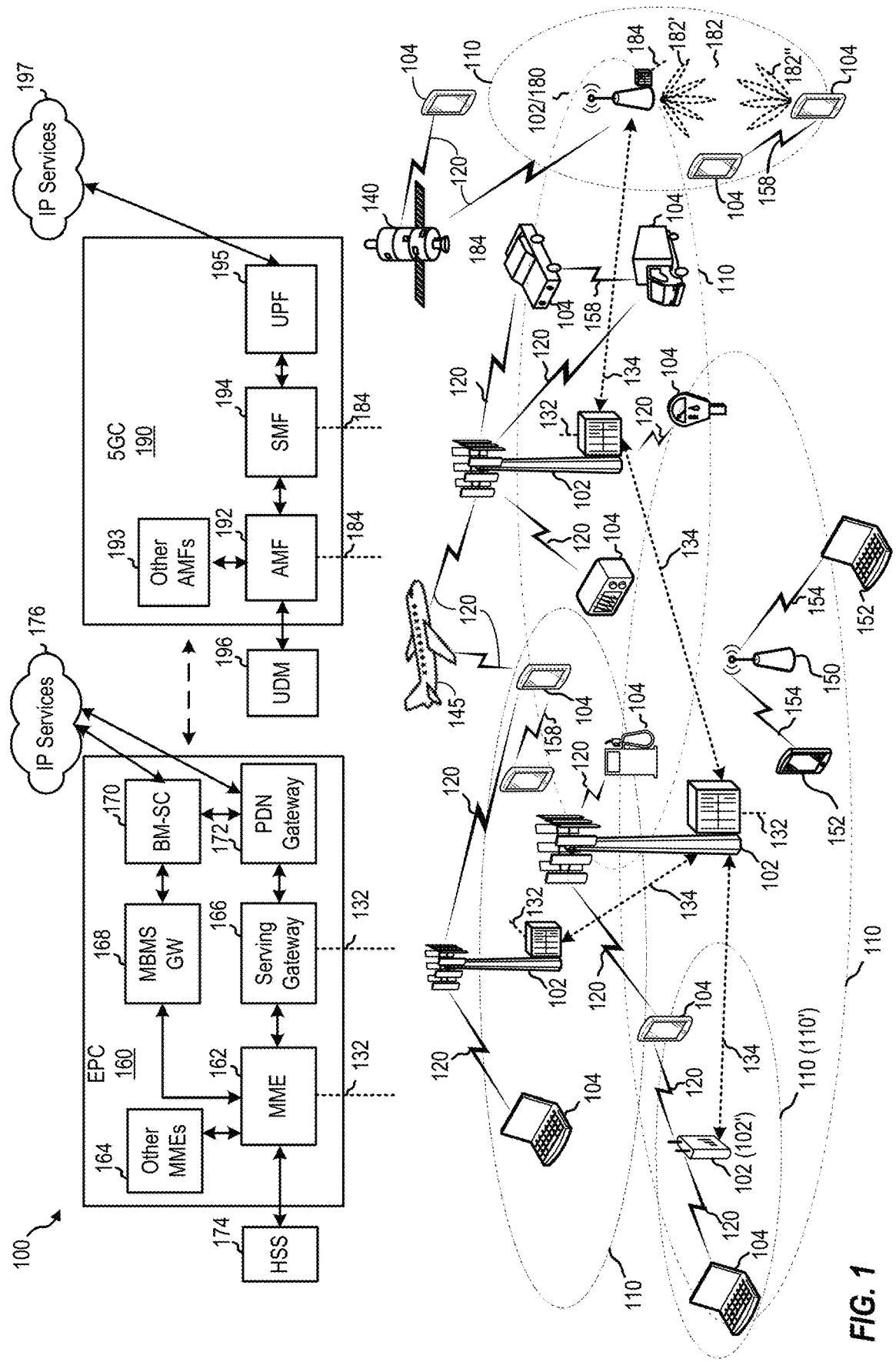
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
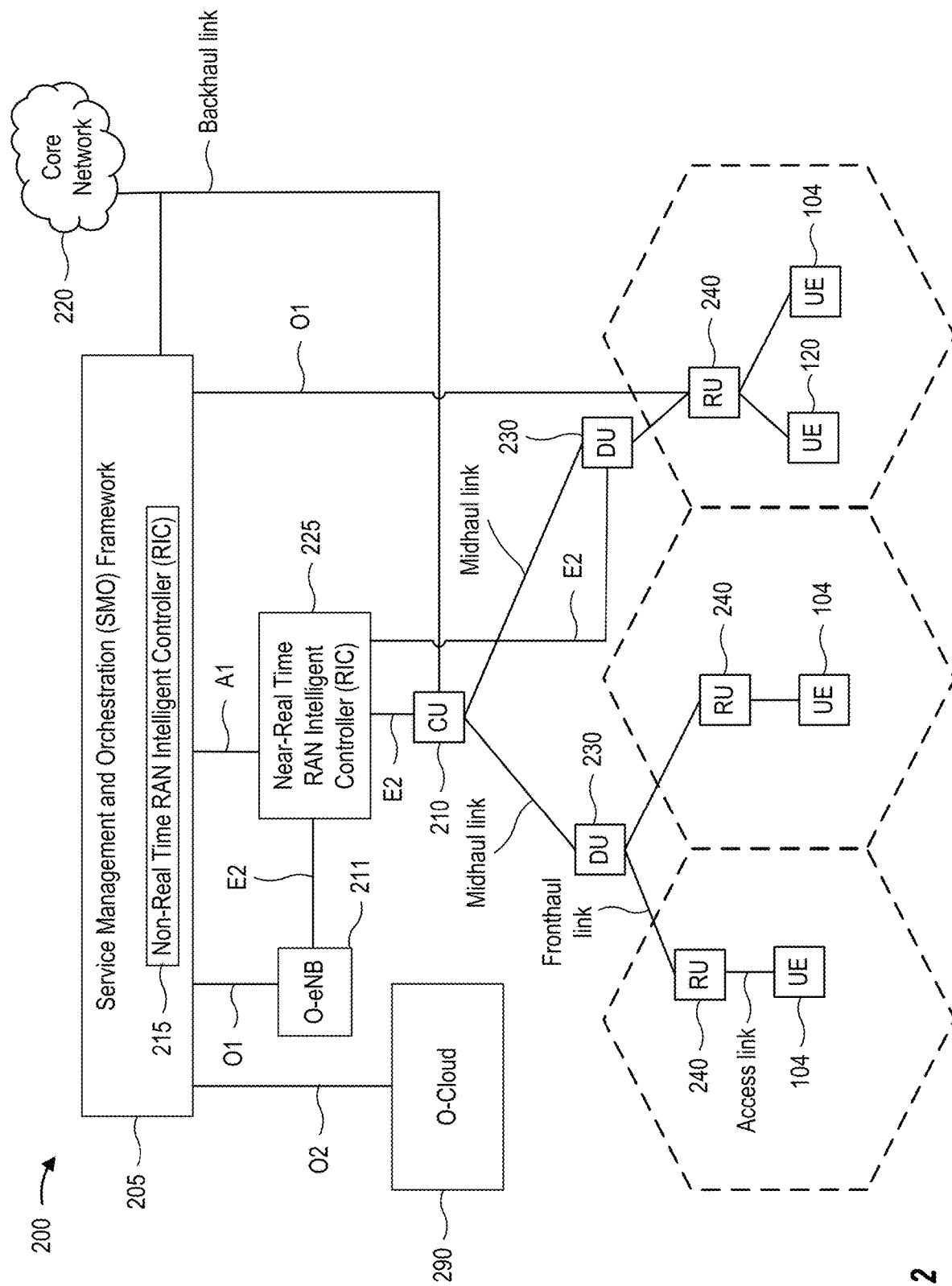
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
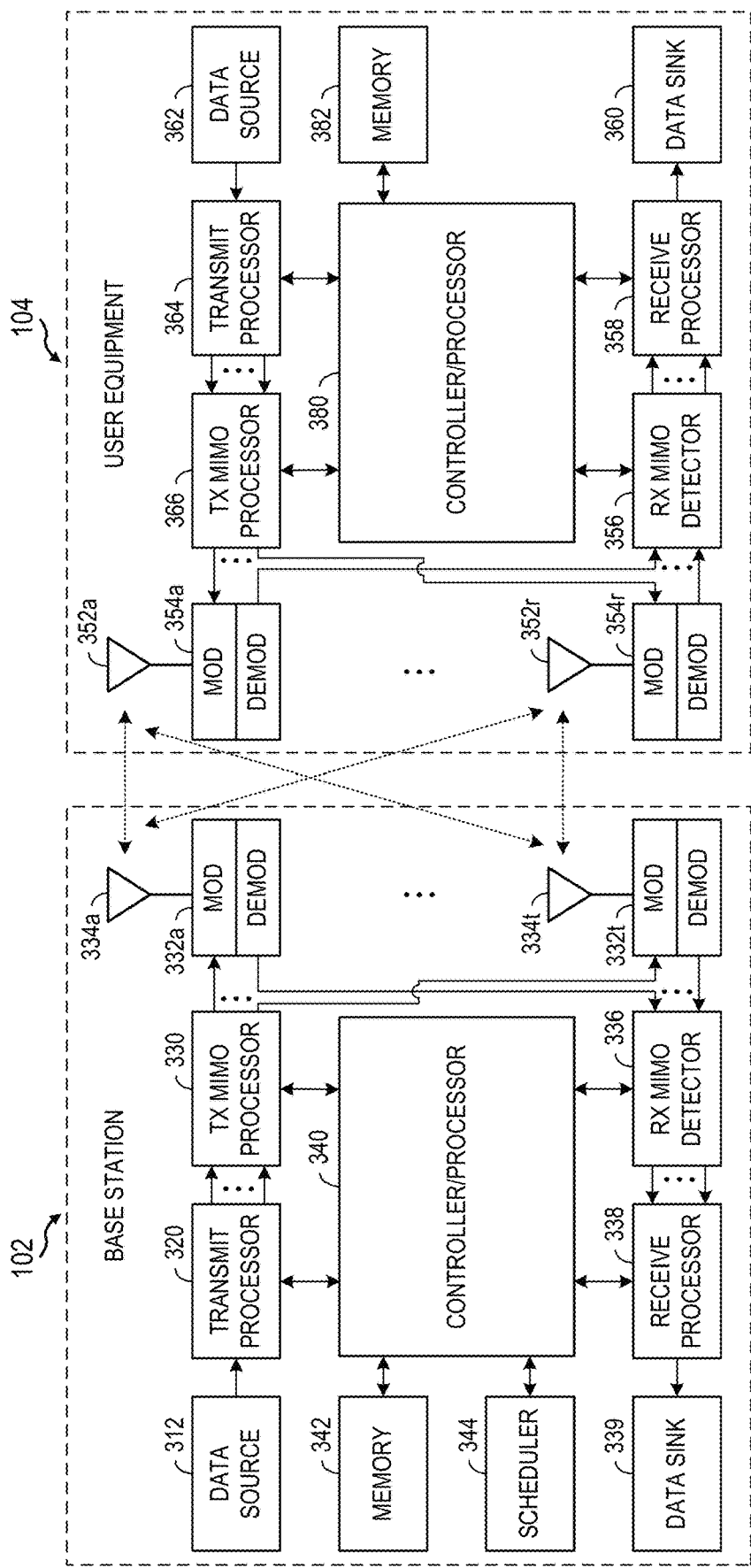
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Indicating Subband Configurations in Subband Full Duplex Operation In typical cellular communications systems operating using time domain duplexing (TDD), the network (e.g., a network entity, such as a BS or a node of a disaggregated BS) may indicate to the UEs a TDD UL/DL configuration of transmit directions for slots or subframes of a frame. Such a TDD UL/DL configuration may be broadcast in a SystemInformationBlockType1 (SIB1) in a cell and may have a form similar to DDDDDDDFUU, where each "D" indicates a slot that is for DL transmissions, each "U" indicates a slot that is for UL transmissions, and each "F" indicates a flexible slot that may be dynamically switched between being used for UL transmissions and DL transmissions.

Changing a TDD UL/DL configuration in a cell is typically done by broadcasting a SIB1 with the new TDD UL/DL configuration in the cell. Broadcasting a SIB1 having a changed TDD UL/DL configuration typically involves paging all UEs in the cell to notify the UEs of the change, and thus takes some time to accomplish.

In aspects of the present disclosure, a cell may operate using subband full duplex (SBFD) communications, in which a network entity uses some antennas to transmit one or more DL signals via one or more subbands of a component carrier (CC) to one or more UEs while simultaneously using other antennas to receive UL signals via other subbands of the CC from other UEs. SBFD communications may increase an UL duty cycle in the cell for at least some UEs, which may lead to a latency reduction because UEs may be able to receive DL signals in UL-only slots and lead to an UL coverage improvement. In addition, SBFD may enhance system capacity, resource utilization, and/or spectrum efficiency. SBFD may also enable flexible and dynamic UL/DL resource adaption according to UL and DL traffic in the cell in a robust manner.

According to aspects of the present disclosure, a cell may operate using subband half duplex communications, in which a network entity, during a slot or symbol, either transmits one or more DL signals via one or more subbands of a component carrier (CC) to one or more UEs or receives UL signals via other subbands of the CC from the UEs. Subband half duplex communications may increase an UL duty cycle in the cell for at least some UEs, which may lead to a latency reduction because UEs may be able to receive DL signals in UL-only slots and lead to an UL coverage improvement. In addition, cells operating using subband half duplex communications may avoid causing cross-link interference (CLI) that can be associated with SBFD communications. For example, if a cell only receives UL transmissions on a subband during a slot or symbol, then that cell does not transmit DL signals that may cause CLI for a neighbor cell receiving UL transmissions during the slot or symbol. In another example, if a cell only transmits DL transmissions on a subband during a slot or symbol, then that cell does not schedule any UEs to transmit UL signals that may cause CLI for other UEs in the cell receiving the DL transmissions during the slot or symbol.

Figure 5:
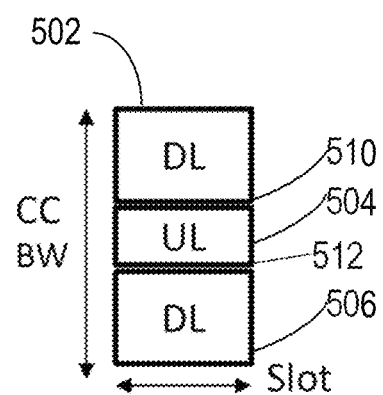
FIG. 5 depicts an example subband configuration of a component carrier during a slot, in accordance with aspects of the present disclosure.

FIG. 5 depicts an example subband configuration 500 of a component carrier during a slot, in accordance with aspects of the present disclosure. In the example subband configuration, an UL subband 504 is configured between two DL subbands 502 and 506. Guard bands (GBs) 510 and 512 separate the UL subband from each of the two DL subbands.

Figure 6:
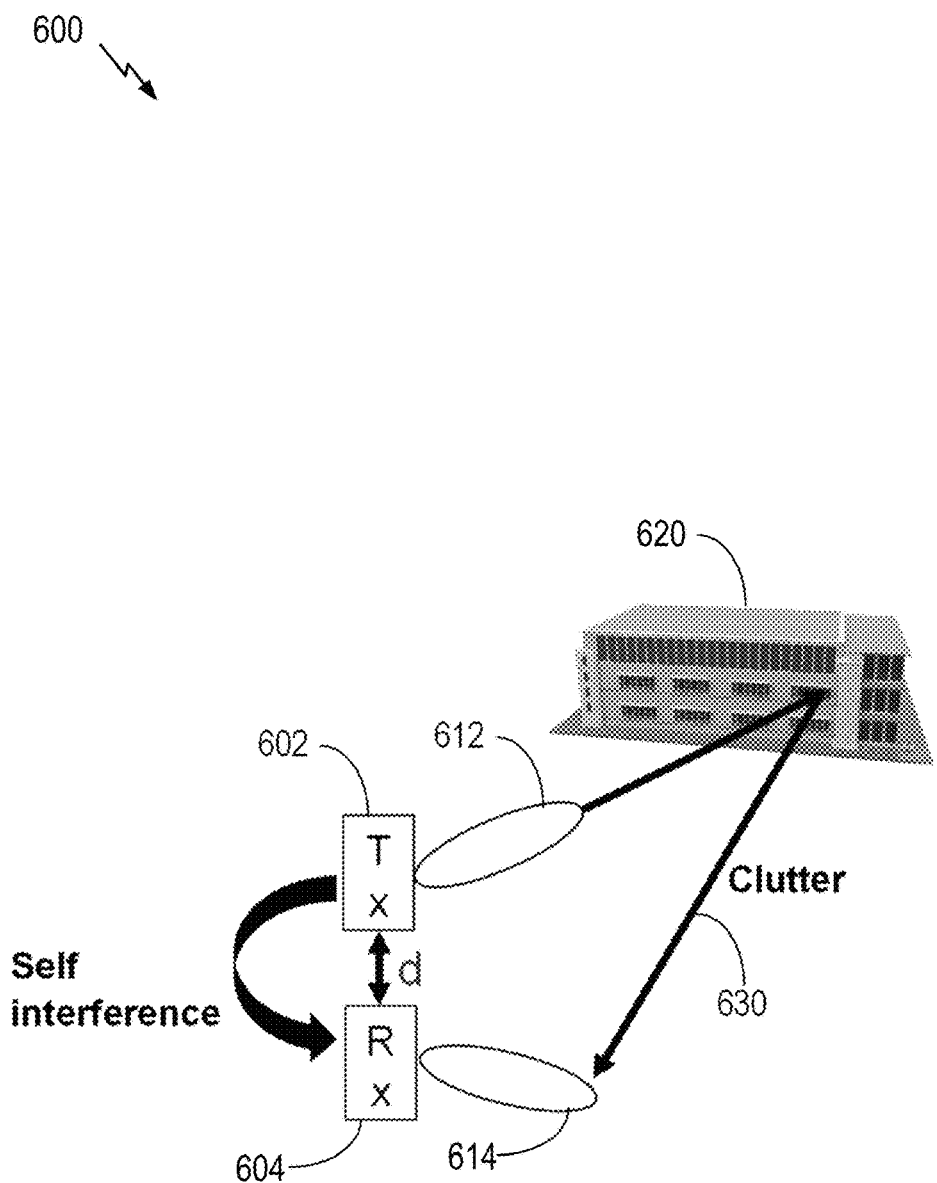
FIG. 6 depicts in block form a network entity operating in full duplex mode, according to aspects of the present disclosure.

FIG. 6 depicts in block form a network entity (e.g., BS 102) operating in full duplex mode, according to aspects of the present disclosure. As illustrated, a first antenna 602 of the network entity transmits a signal using a first beam 612 while a second antenna 604 of the network entity receives another signal using a second beam 614. The first antenna may be separated from the second antenna by a distance d. The signal from the first antenna may be directly received by the second antenna, resulting in self interference with the other signal being received by the second antenna. In addition, the first signal may reflect from an object 620 in the environment, and the reflected signal may also be received by the second antenna, resulting in clutter 630 affecting reception of the other signal by the second antenna. Both the self interference and the clutter may be at least partially mitigated by causing the transmitted signal from the first antenna to be on a different subband from the signal being received by the second antenna.

Figure 7:
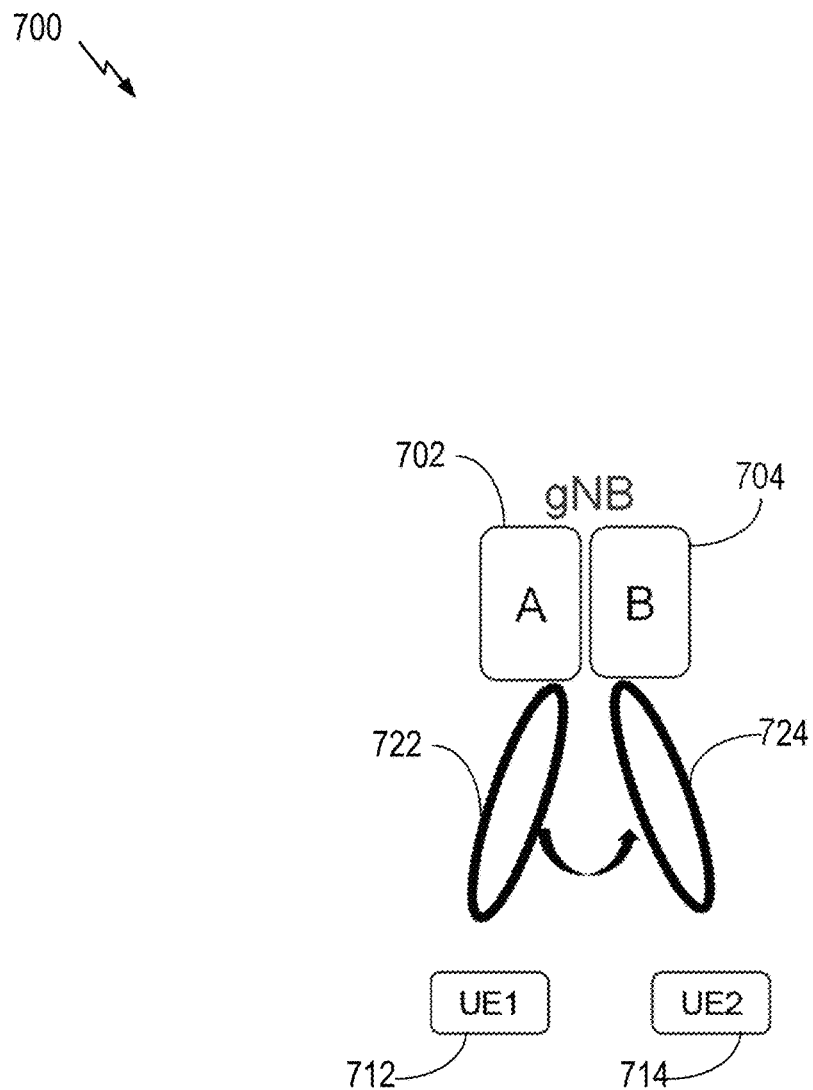
FIG. 7 depicts in block form a gNB and two UEs performing subband full duplex (SBFD) operations, according to aspects of the present disclosure.

FIG. 7 depicts in block form a gNB and two UEs 712 and 714 performing SBFD operations, according to aspects of the present disclosure. As illustrated, a first antenna 702 of the gNB transmits a signal to the UE 712 on a first subband using a first beam 722 while a second antenna 704 of the gNB receives another signal from the UE 714 on a second subband using a second beam 724. As illustrated, the first signal may interfere with reception of the second signal by the second antenna.

A typical UE cannot instantaneously switch from receiving a downlink signal in a downlink slot or symbol to transmitting an uplink signal in an uplink slot or symbol, because the UE may switch components of an RF chain when changing from receiving to transmitting and because the UE may need to change settings of components (e.g., amplifiers), and switching components and changing settings cannot typically be accomplished instantaneously. Even when a UE is configured to change from receiving to transmitting in a predetermined pattern, switching components and changing settings of components cannot accommodate changing from receiving to transmitting instantaneously. For example, a UE changing from subband full duplex (SBFD) operation to half duplex (HD) operation may apply advanced selectivity and/or adaptive filter techniques during an SBFD slot or symbol to minimize inter-UE cross-link interference (CLI) and save power. To enable such techniques, a UE may take some time to tune some RF or baseband blocks and/or filters.

In addition, the UE UL timing and/or timing advance (TA) may differ between UL slots in HD operation and an UL subband in SBFD operation. For example, a UE may have an adjusted UL UE TA for aligning with gNB DL and UL timing and have TA offset of 0 for an SBFD slot. In another example, a UE may have an adjusted UL UE TA for inter-UE CLI mitigation for an SBFD slot that differs from a TA for an HD slot.

Accordingly, it is desirable to develop techniques for guard period configuration between SBFD and HD symbols and slots for the purpose of accommodating different component switch times for different UEs to avoid inter-cell interference at network entities and to enable UEs to perform inter-UE CLI mitigation.

Aspects Related to Guard Period Configuration Between Subband Full Duplex and Half Duplex Symbols and Slots According to aspects of the present disclosure, techniques for guard period configuration between SBFD and HD symbols and slots are provided. By configuring guard periods between SBFD symbols and slots and HD symbols and slots, UEs may be enabled to 1) apply advanced selectivity and/or adaptive transmit and/or receive filter tuning; and 2) change parameters in response to the transmission to reception direction switch, such as changing an UL timing advance.

In aspects of the present disclosure, a cell may switch between SBFD and HD communications within a slot thus enabling mini-slot switching between SBFD and HD communications. In such cases, a guard period may occupy one or more symbols between an SBFD mini-slot and an HD mini-slot.

According to aspects of the present disclosure, a cell may switch between SBFD and HD communications across two slots (e.g., from a legacy DL slot to an SBFD slot), and a guard period may occupy one or more last symbols of a legacy DL slot or first symbols of an SBFD slot.

In aspects of the present disclosure, a communications specification may define a rule wherein a guard period between SBFD communications and HD communications in a cell is a fixed number, N (e.g., an integer), of symbols or a fixed number, K, of microseconds (µs). When the guard period is defined as K UEs and network entities may map the K µs to N symbols, based on a subcarrier spacing (SCS) of a current operating band of the cell. Such a rule for defining the guard period between SBFD and HD symbols may consider, for example, filter tuning latency, legacy direction switching latency, TA change latency, and the like. The rule may determine the guard period as a maximum value of switching latencies (e.g., considering filter tuning latency, legacy direction switching latency, TA change latency, and other sources of switching latency) for various kinds of UEs.

According to aspects of the present disclosure, a network entity (e.g., a gNB) may configure a cell-specific guard period of N symbols (e.g., an integer) or K µs for all of the UEs (e.g., individualized) in a cell switching between SBFD communications and HD communications. When the guard period is defined as K UEs and network entities may map the K µs to N symbols, based on a subcarrier spacing (SCS) of a current operating band of the cell. The network entity may consider, for example, filter tuning latency, legacy direction switching latency, TA change latency, and the like when configuring a guard period for each UE.

In aspects of the present disclosure, a cell-specific guard period configured for a cell may be based on one or more UE-reported filter capabilities of the UEs in the cell and corresponding latencies for tuning the filters of the UEs.

According to aspects of the present disclosure, a network entity (e.g., a gNB) may configure a different switching latency per UE based on different cases. For example, a network entity may configure a common value for any change between SBFD and HD communications and add UE-specific values, such as values based on filter capabilities of UEs. In another example, a network entity may configure different values for changing between SBFD and HD based on whether a UE is changing from SBFD to HD or from HD to SBFD and different values for whether a UE is changing from UL to DL, from DL to UL, between HD UL and SBFD UL, or between HD DL and SBFD DL (see also the description below with reference to FIGS. 9-16).

In aspects of the present disclosure, a UE-specific guard period configured for a UE may be based on a UE-reported filter capability and a corresponding latency.

According to aspects of the present disclosure, a UE-specific guard period may be based on one or more of: a period for switching from receiving downlink signals to transmitting uplink signals, referred to as N1 in typical wireless communications systems; a period for changing a TA, referred to as T1 in typical wireless communications systems; a period for tuning an analog or digital transmit filter from a wideband filter to a narrower UL subband filter, referred to as M1 in typical wireless communications systems; or a period for tuning advanced selectivity or a receiver filter from a wideband filter to a non-contiguous narrower DL subband filter, referred to as M2 in typical wireless communications systems. In some cases, these periods can be given as different values of $K_i$ µs, which can be mapped to N1, T1, M1, or M2 symbols, depending on a SCS of a current operating band of the cell.

In aspects of the present disclosure, a network entity (e.g., a gNB) may configure a guard period as a transient period (e.g., K µs), and UL or DL transmit samples are masked (not used) by UEs and network entities within this period.

According to aspects of the present disclosure, a wireless communications specification may include a rule for UEs and/or network entities to mask transmit samples during a guard period.

In aspects of the present disclosure, a guard period may only be allowed at a first symbol of slot, so the guard period can be accommodated within a longer cyclic prefix (CP) of the first symbol of the slot.

According to aspects of the present disclosure, in order to support SBFD operation in a cell, a UE (e.g., UE 104) may obtain an indication of a guard period during which a cell in which the UE is communicating will switch between subband full duplex (SBFD) communications and half duplex (HD) communications. The UE may then perform one or more actions during the guard period, in accordance with the indication.

In aspects of the present disclosure, a network entity may provide an indication (e.g., by transmitting a configuration) of a guard period during which a cell in which the network entity is communicating will switch between subband full duplex (SBFD) communications and half duplex (HD) communications. The network entity may then refrain from communicating with a user equipment (UE) in the cell during the guard period, in accordance with the indication.

Example Operations of Entities in a Communications Network

Figure 8:
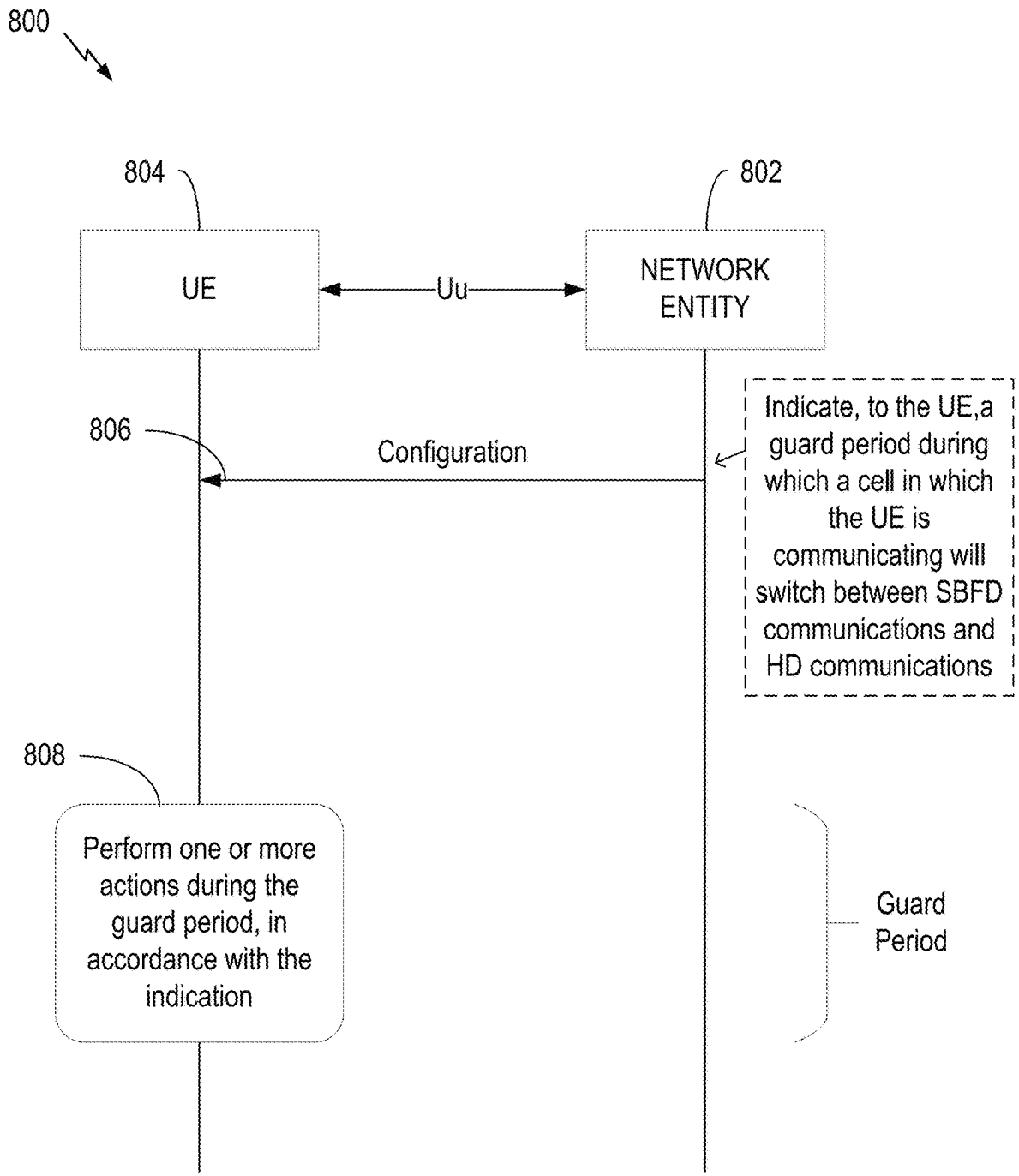
FIG. 8 depicts an example call flow for communications in a network between a network entity and a UE, in accordance with aspects of the present disclosure.

FIG. 8 depicts an example call flow 800 for communications in a network between a network entity 802 and a UE 804. In some aspects, the network entity 902 may be an example of the BS 102 depicted and described with respect to FIGS. 1 and 3 or a disaggregated base station depicted and described with respect to FIG. 2. However, in other aspects the network entity 802 may be another type of network entity or network node, such as those described herein.

At 806, the network entity 802 provides, and the UE 804 obtains, an indication of a guard period during which a cell in which the UE is communicating will switch between subband full duplex (SBFD) communications and half duplex (HD) communications. For example, the network entity may transmit a configuration for changing between SBFD communications and HD communications according to a predetermined pattern, and the UE may determine (e.g., according to a preconfigured rule) a guard period for the changes between SBFD and HD communications. At 808, the UE performs one or more actions during the guard period, in accordance with the indication. For example, the UE may retune a receive filter or change a timing advance.

Figure 9:
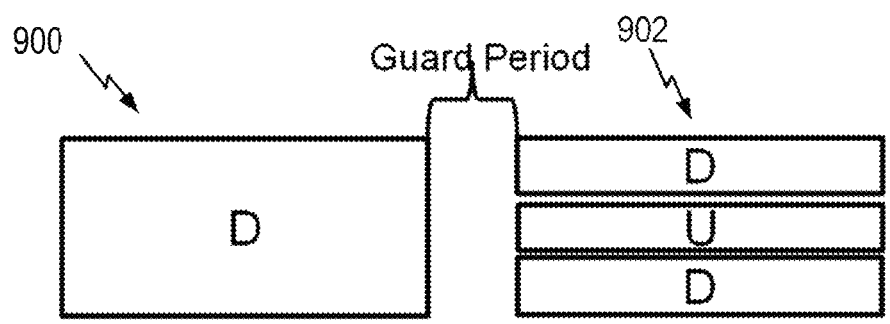
FIG. 9 depicts an example timeline for communications in a network between a network entity and a UE in a cell switching between SBFD communications and HD communications, in accordance with aspects of the present disclosure.

FIG. 9 depicts an example timeline for communications in a network between a network entity and a UE in a cell switching between SBFD communications and HD communications, in accordance with aspects of the present disclosure. In the example timeline, the cell switches from DL transmissions on a legacy TDD band (an example of HD communications) at 900 to SBFD communications at 902. In the example timeline, the UE is transmitting an UL signal on an UL subband (e.g., the middle subband) of an SBFD symbol or slot. In the example, if the UL transmitter bandwidth of the UE needs to switch from a wide bandwidth to a narrower UL subband, then the switching latency from HD communications to SBFD communications for the UE may be a maximum of N1 symbols for switching from DL to UL communications in a TDD system or M1 symbols of analog or digital transmit filter tuning latency for tuning a wideband filter to a narrower UL subband filter, if the UE is capable of this type of transmit filter tuning. If the UL transmit filter of the UE does not need to retune (e.g., the transmitter is already tuned to the UL subband bandwidth or the UE is not capable of transmit filter tuning), then the switching latency may depend on N1 symbols for switching from DL to UL communications in a TDD system. The guard period for the UE may be determined based on the switching latency of the UE.

Figure 10:
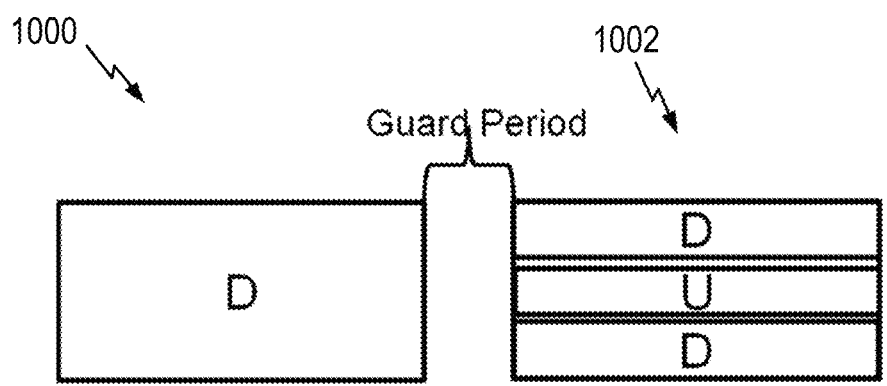
FIG. 10 depicts an example timeline for communications in a network between a network entity and a UE in a cell switching between SBFD communications and HD communications, in accordance with aspects of the present disclosure.

FIG. 10 depicts an example timeline for communications in a network between a network entity and a UE in a cell switching between SBFD communications and HD communications, in accordance with aspects of the present disclosure. In the example timeline, the cell switches from DL transmissions on a legacy TDD band (an example of HD communications) at 1000 to SBFD communications at 1002. In the example timeline, the UE is receiving a DL signal on the DL subbands (e.g., the outer two subbands) of an SBFD symbol or slot. In the example, switching latency of the UE can depend on M2 symbols for configuring advanced selectivity or receive filter tuning from a wideband filter to non-contiguous narrower DL subband filter, if the UE is capable. The guard period for the UE may be determined based on the switching latency of the UE.

In aspects of the present disclosure, the UE in FIG. 10 may have (e.g., be configured with) a different guard period than another UE in the same cell that is configured to transmit an UL signal on the UL subband (e.g., the UE in FIG. 9). The guard periods of UEs receiving DL signals may be different from the guard periods of UEs transmitting UL signals in an SBFD slot or symbol.

Figure 11:
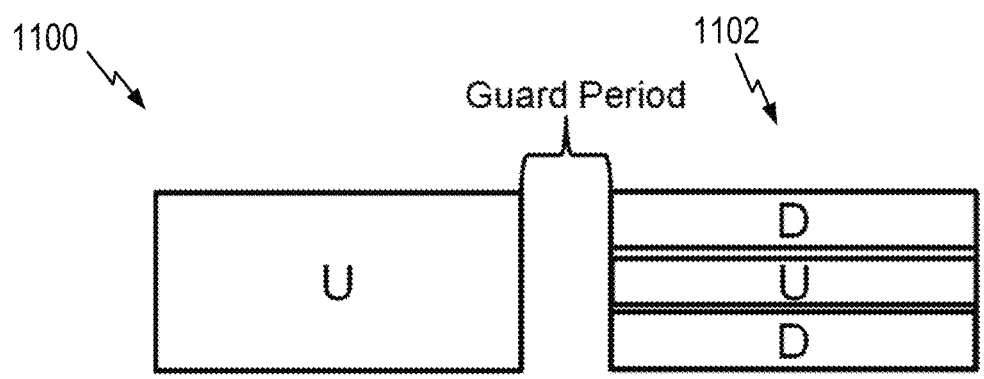
FIG. 11 depicts an example timeline for communications in a network between a network entity and a UE in a cell switching between SBFD communications and HD communications, in accordance with aspects of the present disclosure.

FIG. 11 depicts an example timeline for communications in a network between a network entity and a UE in a cell switching between SBFD communications and HD communications, in accordance with aspects of the present disclosure. In the example timeline, the cell switches from UL transmissions on a legacy TDD band (an example of HD communications) at 1100 to SBFD communications at 1102. In the example timeline, the UE is receiving a DL signal on the DL subbands (e.g., the outer two subbands) of an SBFD symbol or slot. In the example, if the DL receiver bandwidth of the UE needs to switch from a wide bandwidth to a narrower DL subband(s), then the switching latency from HD communications to SBFD communications for the UE may depend on M2 symbols for configuring advanced selectivity or receive filter tuning latency from a wideband filter to a non-contiguous narrower DL subband filter, if the UE is capable. It may be noted that typical UEs in TDD systems do not require a guard period for switching from transmitting UL signals to receiving DL signals. If the receive filter of the UE does not need to switch (e.g., the receiver is already tuned to the DL subband(s) or the UE is not capable of receive filter tuning), then the switching latency for the UE could be zero. The guard period for the UE may be determined based on the switching latency of the UE.

Figure 12:
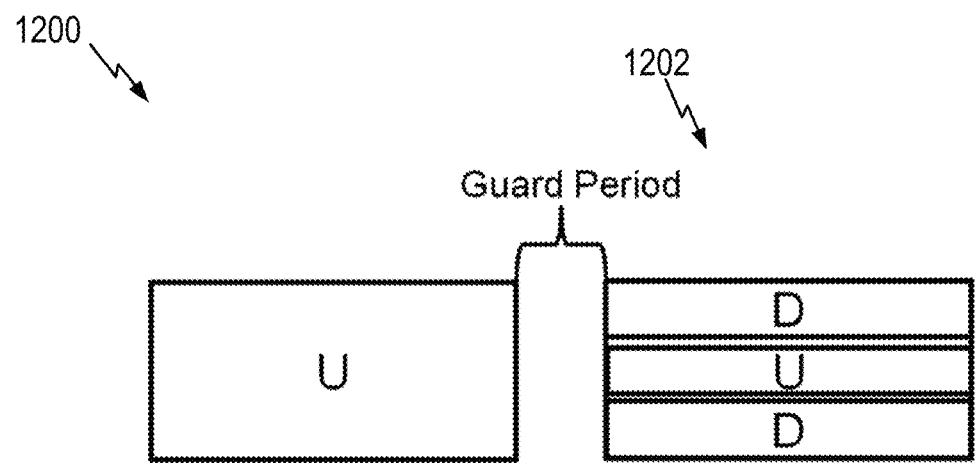
FIG. 12 depicts an example timeline for communications in a network between a network entity and a UE in a cell switching between SBFD communications and HD communications, in accordance with aspects of the present disclosure.

FIG. 12 depicts an example timeline for communications in a network between a network entity and a UE in a cell switching between SBFD communications and HD communications, in accordance with aspects of the present disclosure. In the example timeline, the cell switches from UL transmissions on a legacy TDD band (an example of HD communications) at 1200 to SBFD communications at 1202. In the example timeline, the UE is transmitting an UL signal on an UL subband (e.g., the middle subband) of an SBFD symbol or slot. In the example, if the UL transmitter bandwidth of the UE needs to switch from a wide bandwidth to a narrower UL subband, and if the UE UL timing and/or timing advance differs between UL slots (as at 1200) and an UL subband (as at 1202), then the switching latency from HD communications to SBFD communications for the UE may be a maximum of T1 symbols of TA change latency or M1 symbols of analog or digital transmit filter tuning latency for tuning a wideband filter to a narrower UL subband filter, if the UE is capable of this type of transmit filter tuning. If the UL transmit filter of the UE does not need to retune (e.g., the transmitter is already tuned to the UL subband bandwidth or the UE is not capable of transmit filter tuning), and if the UE UL timing and/or timing advance differs between UL slots and an UL subband in an SBFD slot, then the switching latency of the UE may depend on only the T1 symbols for changing TA. If the UE transmit filter needs to and is capable of switching from a wide bandwidth to a narrower UL subband, and if the UE UL timing and/or timing advance are the same for UL slots and UL subbands in SBFD slots, then the switching latency for the UE may depend on only the M1 symbols for retuning the transmit filter from a wideband filter to a narrower UL subband filter. Otherwise, the switching latency may be zero. The guard period for the UE may be determined based on the switching latency of the UE.

Figure 13:
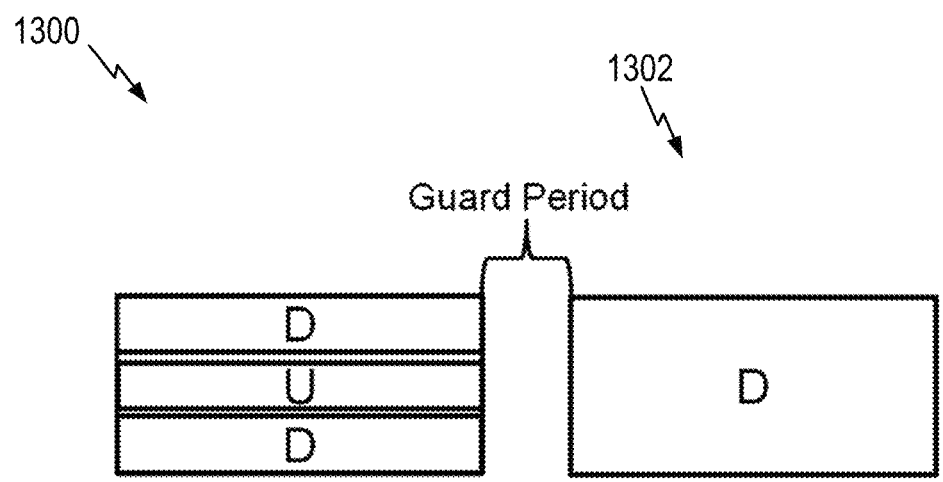
FIG. 13 depicts an example timeline for communications in a network between a network entity and a UE in a cell switching between SBFD communications and HD communications, in accordance with aspects of the present disclosure.

FIG. 13 depicts an example timeline for communications in a network between a network entity and a UE in a cell switching between SBFD communications and HD communications, in accordance with aspects of the present disclosure. In the example timeline, the cell switches from SBFD communications at 1300 to DL transmissions on a legacy TDD band (an example of HD communications) at 1302. In the example timeline, the UE is transmitting an UL signal on an UL subband (e.g., the middle subband) of an SBFD symbol or slot. In the example, if the UL transmitter bandwidth of the UE needs to switch from a narrower DL subband to a wide bandwidth, then the switching latency from SBFD communications to HD communications for the UE may be based on M2 symbols of analog or digital receive filter tuning latency for tuning a narrower DL subband filter to a wideband filter, if the UE is capable of this type of transmit filter tuning. It may be noted that typical UEs in TDD systems do not require a guard period for switching from transmitting UL signals to receiving DL signals. If the DL receive filter of the UE does not need to retune (e.g., the receiver is already tuned to the wide DL bandwidth or the UE is not capable of receive filter tuning), then the switching latency may be zero. The guard period for the UE may be determined based on the switching latency of the UE.

Figure 14:
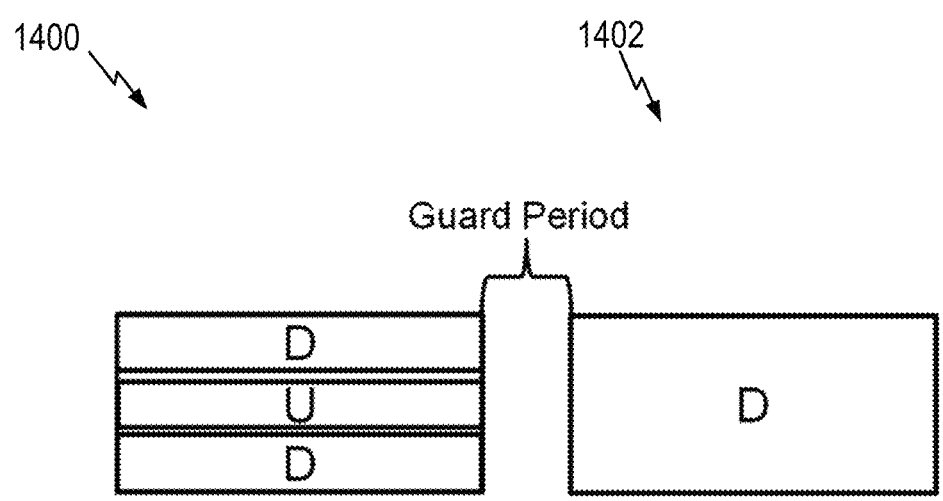
FIG. 14 depicts an example timeline for communications in a network between a network entity and a UE in a cell switching between SBFD communications and HD communications, in accordance with aspects of the present disclosure.

FIG. 14 depicts an example timeline for communications in a network between a network entity and a UE in a cell switching between SBFD communications and HD communications, in accordance with aspects of the present disclosure. In the example timeline, the cell switches from SBFD communications at 900 to DL transmissions on a legacy TDD band (an example of HD communications) at 902. In the example timeline, the UE is receiving a DL signal on a DL subband(s) (e.g., the outer two subbands) of an SBFD symbol or slot. In the example, the switching latency from SBFD communications to HD communications for the UE may be M2 symbols of analog or digital receive filter tuning latency for tuning a narrower DL subband filter to a wideband DL filter, if the UE is capable of this type of receive filter tuning. The guard period for the UE may be determined based on the switching latency of the UE.

Figure 15:
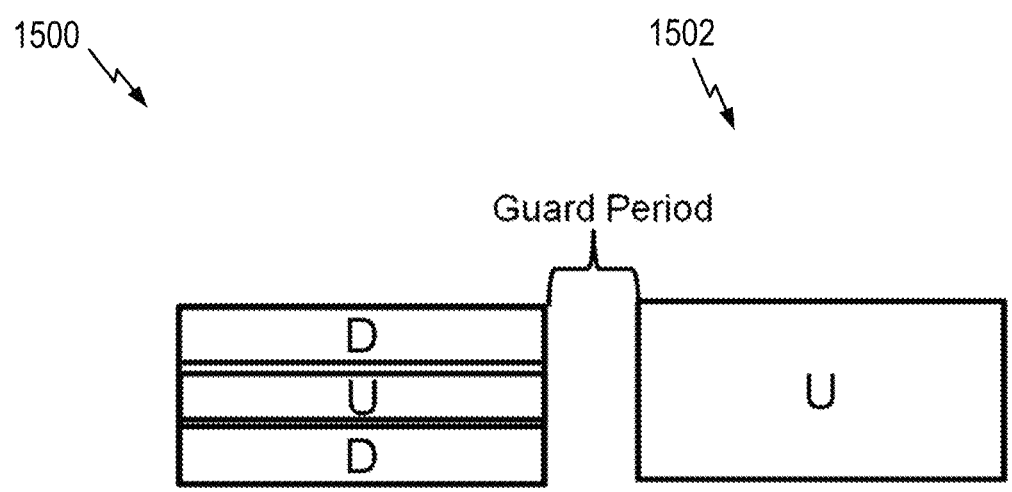
FIG. 15 depicts an example timeline for communications in a network between a network entity and a UE in a cell switching between HD communications and SBFD communications, in accordance with aspects of the present disclosure.

FIG. 15 depicts an example timeline for communications in a network between a network entity and a UE in a cell switching between HD communications and SBFD communications, in accordance with aspects of the present disclosure. In the example timeline, the cell switches from SBFD communications at 900 to UL transmissions on a legacy TDD band (an example of HD communications) at 902. In the example timeline, the UE is receiving a DL signal on a DL subband(s) (e.g., the outer two subbands) of an SBFD symbol or slot. In the example, if the UL transmitter bandwidth of the UE needs to switch from a narrower UL subband to a wide bandwidth, then the switching latency from SBFD communications to HD communications for the UE may be a maximum of N1 symbols for switching from DL to UL communications in a TDD system or M1 symbols of analog or digital transmit filter tuning latency for tuning a narrower UL subband filter to a wideband filter, if the UE is capable of this type of transmit filter tuning. If the UL transmit filter of the UE does not need to retune (e.g., the transmitter is already tuned to the UL wide bandwidth or the UE is not capable of transmit filter tuning), then the switching latency may depend on N1 symbols for switching from DL to UL communications in a TDD system. The guard period for the UE may be determined based on the switching latency of the UE.

Figure 16:
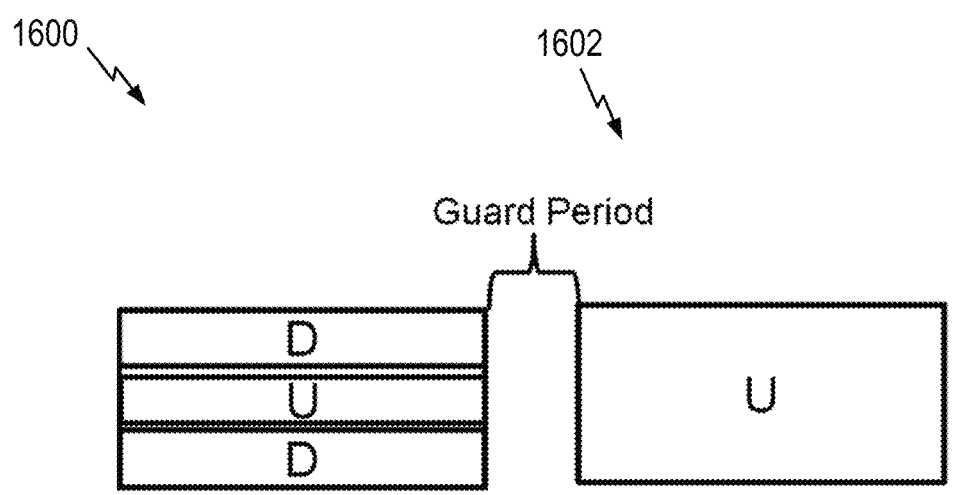
FIG. 16 depicts an example timeline for communications in a network between a network entity and a UE in a cell switching between HD communications and SBFD communications, in accordance with aspects of the present disclosure.

FIG. 16 depicts an example timeline for communications in a network between a network entity and a UE in a cell switching between HD communications and SBFD communications, in accordance with aspects of the present disclosure. In the example timeline, the cell switches from SBFD communications at 900 to UL transmissions on a legacy TDD band (an example of HD communications) at 902. In the example timeline, the UE is transmitting an UL signal on an UL subband (e.g., the middle subband) of an SBFD symbol or slot. In the example, if the UL transmitter bandwidth of the UE needs to switch from a narrower UL subband to a wide bandwidth, then the switching latency from SBFD communications to HD communications for the UE may be a maximum of T1 symbols of TA change latency or M1 symbols of analog or digital transmit filter tuning latency for tuning a narrower UL subband filter to a wideband filter, if the UE is capable of this type of transmit filter tuning. If the UL transmit filter of the UE does not need to retune (e.g., the transmitter is already tuned to the UL subband bandwidth or the UE is not capable of transmit filter tuning), then the switching latency may depend on only the T1 symbols of TA change latency. If the UE transmit filter needs to and is capable of switching from a narrower UL subband to a wide bandwidth, and if the UE UL timing and/or timing advance are the same for UL slots and UL subbands in SBFD slots, then the switching latency for the UE may depend on only the M1 symbols for retuning the transmit filter from a narrower UL subband filter to a wideband filter. Otherwise, the switching latency may be zero. The guard period for the UE may be determined based on the switching latency of the UE.

In aspects of the present disclosure, other parameters may affect a switching latency for a UE to change between SBFD communications and HD communications.

According to aspects of the present disclosure, filter tuning latency for a UE may depend on each UE's reported filter tuning capability and a corresponding latency. The filter tuning latency for a UE could be further separated or differentiated based on which filter is implemented in the UE. The UE may report a latency per filter or a combined latency of all implemented and tuned low-pass and digital filters.

In aspects of the present disclosure, a guard period for changing between SBFD communications and HD communications may occur in a flexible (F) symbol or in a special "S" symbol.

Example Operations of a User Equipment

Figure 17:
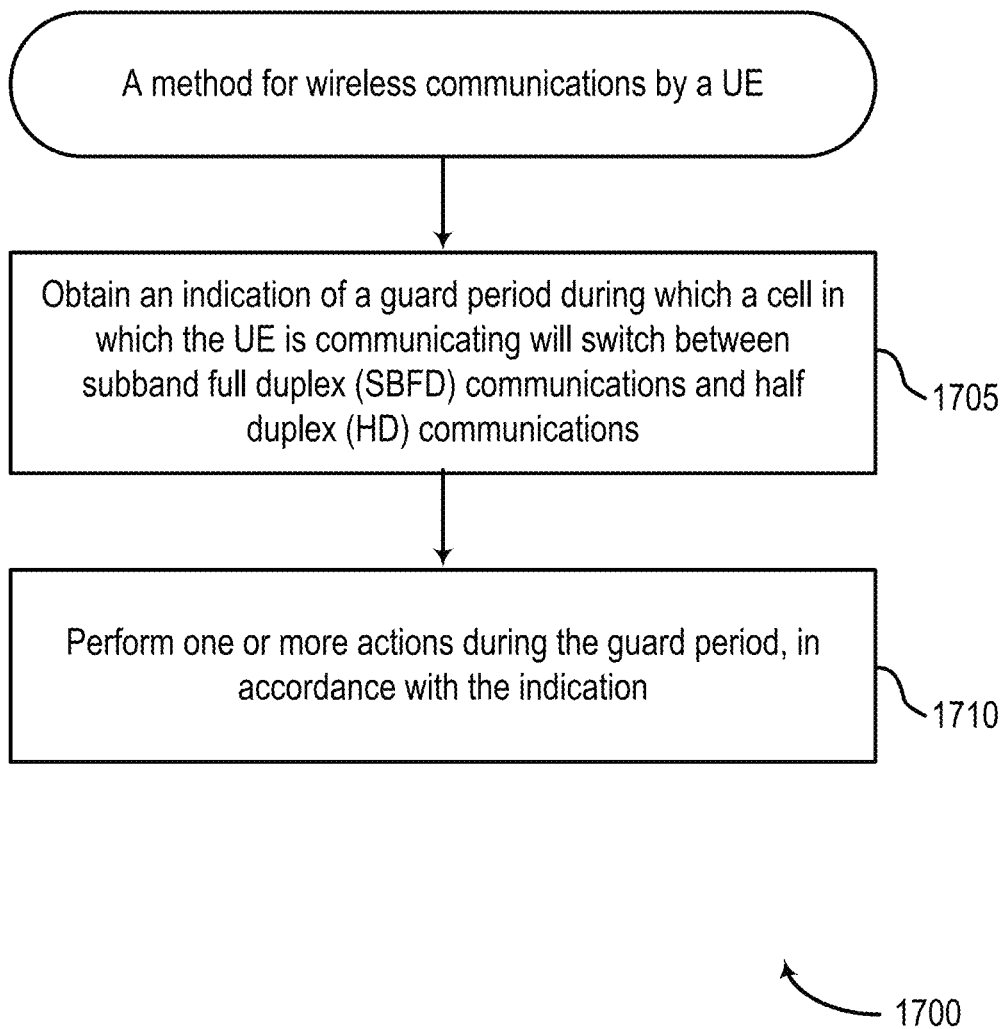
FIG. 17 depicts a method for wireless communications.

FIG. 17 shows an example of a method 1700 for wireless communications by a UE, such as a UE 104 of FIGS. 1 and 3.

Method 1700 begins at step 1705 with obtaining an indication of a guard period during which a cell in which the UE is communicating will switch between subband full duplex (SBFD) communications and half duplex (HD) communications. In some cases, the operations of this step refer to, or may be performed by, circuitry for receiving and/or code for receiving as described with reference to FIG. 19.

Method 1700 then proceeds to step 1710 with performing one or more actions during the guard period, in accordance with the indication. In some cases, the operations of this step refer to, or may be performed by, circuitry for performing and/or code for performing as described with reference to FIG. 19.

In some aspects, a duration of the guard period is defined in terms of symbols or absolute time units.

In some aspects, the indication indicates the guard period is at least K absolute time units, and the duration of the guard period is an integral number of symbols based on the K absolute time units and a subcarrier spacing (SCS) of a current operating band of the cell.

In some aspects a duration of the guard period depends on a subcarrier spacing (SCS) of a current operating band of the cell.

In some aspects, the indication of the guard period is obtained from a network entity supporting the cell.

In some aspects, a duration of the guard period is based on a reported filter tuning capability of at least one of a transmit filter or a receive filter.

In some aspects, the indication indicates a maximum reported guard period of a plurality of reported guard periods reported by a plurality of UEs communicating in the cell.

In some aspects, a duration of the guard period is UE-specific.

In some aspects, the switch between SBFD and HD communications occurs: within a slot; or across a boundary between adjacent slots, wherein the guard period includes at least one of a last symbol of an HD slot or a first symbol of an SBFD slot.

In some aspects, the one or more actions comprise masking samples within the guard period.

In some aspects, the one or more actions comprise: changing from obtaining a first signal on a legacy time-domain duplex (TDD) band to outputting a second signal for transmission on a subband, the guard period being based on at least one of a time to retune a transmit filter involved in outputting the second signal or a time to change from obtaining on the legacy TDD band to outputting for transmission on the subband.

In some aspects, the one or more actions comprise: changing from obtaining a first signal on a legacy time-domain duplex (TDD) band to obtaining a second signal on at least one subband, the guard period being based on a time to retune a receive filter involved in obtaining the second signal.

In some aspects, the one or more actions comprise: changing from outputting a first signal for transmission on a legacy time-domain duplex (TDD) band to obtaining a second signal on at least one subband, the guard period being based on a time to retune a receive filter involved in obtaining the second signal.

In some aspects, the one or more actions comprise: changing from outputting a first signal for transmission on a legacy time-domain duplex (TDD) band to outputting a second signal for transmission on a subband, the guard period being based on at least one of a timing advance (TA) change latency or a time to retune a transmit filter involved in outputting the second signal for transmission.

In some aspects, the one or more actions comprise: changing from outputting a first signal for transmission on a subband to obtaining a second signal on a legacy time-domain duplex (TDD) band, the guard period being based on a time to retune a receive filter involved in obtaining the second signal.

In some aspects, the one or more actions comprise: changing from obtaining a first signal on at least one subband to obtaining a second signal on a legacy time-domain duplex (TDD) band, the guard period being based on a time to retune a receive filter involved in obtaining the second signal.

In some aspects, the one or more actions comprise: changing from obtaining a first signal on at least one subband to outputting a second signal for transmission on a legacy time-domain duplex (TDD) band, the guard period being based on at least one of a time to retune a transmit filter involved in outputting the second signal for transmission or a time for the UE to change from obtaining the first signal on the at least one subband to outputting the second signal for transmission on the legacy TDD band.

In some aspects, the one or more actions comprise: changing from outputting a first signal for transmission on a subband to outputting a second signal for transmission on a legacy time-domain duplex (TDD) band, the guard period being based on at least one of a timing advance (TA) change latency or a time to retune a transmit filter involved in outputting the second signal for transmission.

In some aspects, the method 1700 further includes outputting for transmission at least one of a transmit filter tuning capability or a receive filter tuning capability, wherein the guard period is based on at least one of the transmit filter tuning capability or the receive filter tuning capability. In some cases, the operations of this step refer to, or may be performed by, circuitry for transmitting and/or code for transmitting as described with reference to FIG. 19.

In some aspects, the guard period includes at least a portion of a downlink symbol, an uplink symbol, a flexible symbol, or a special symbol.

Figure 19:
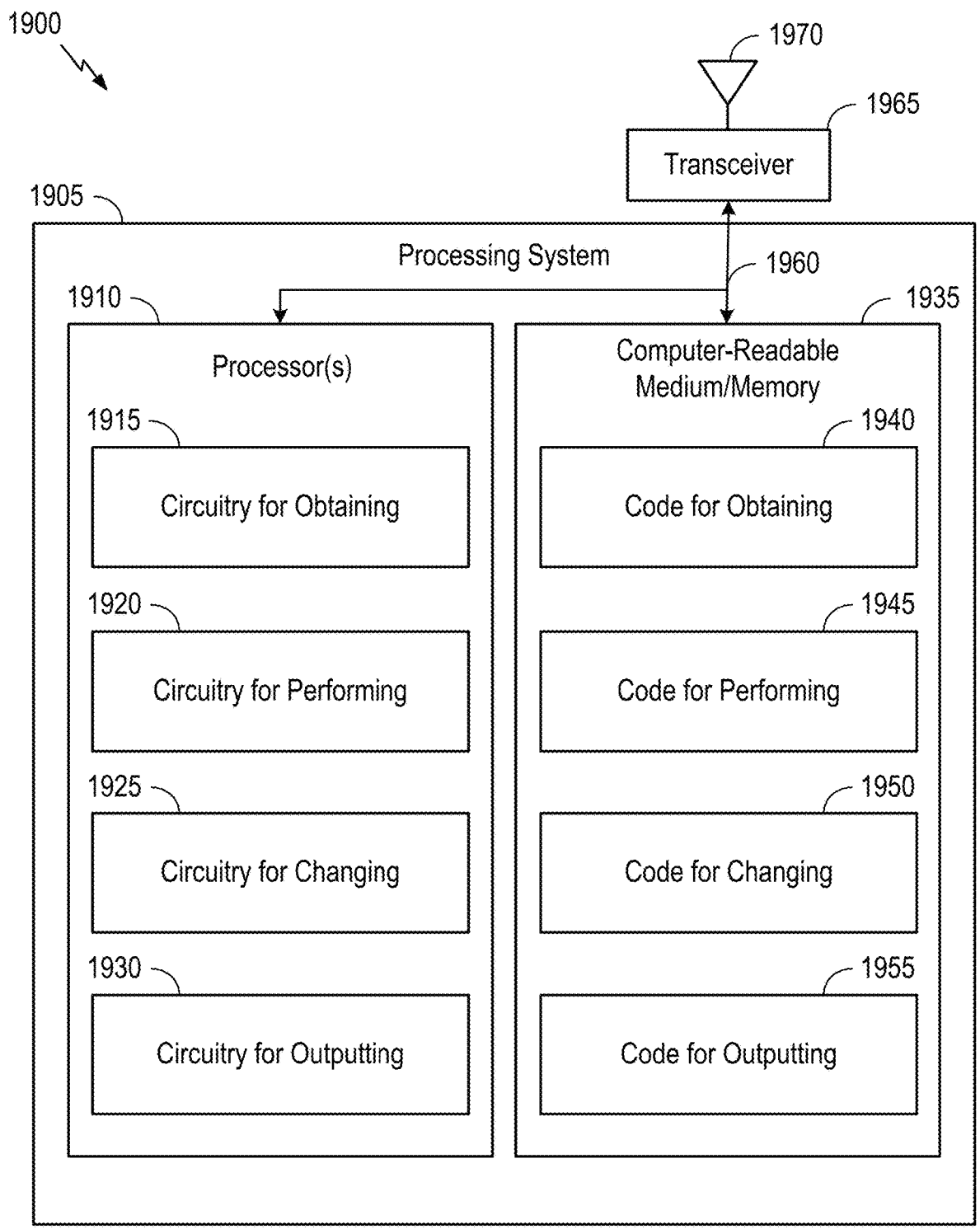
FIG. 19 depicts aspects of an example communications device.

In one aspect, method 1700, or any aspect related to it, may be performed by an apparatus, such as communications device 1900 of FIG. 19, which includes various components operable, configured, or adapted to perform the method 1700.

Communications device 1900 is described below in further detail.

Note that FIG. 17 is just one example of a method, and other methods including fewer, additional, or alternative steps are possible consistent with this disclosure.

Example Operations of a Network Entity

Figure 18:
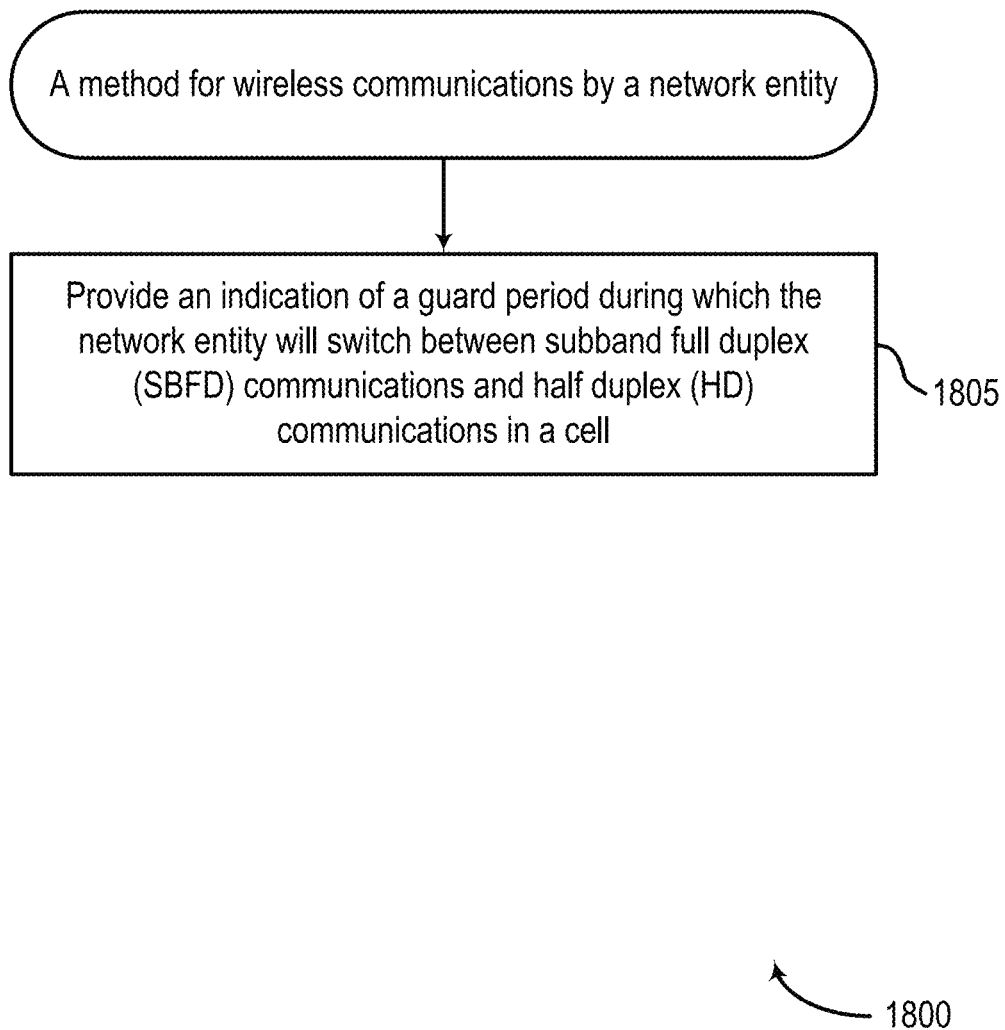
FIG. 18 depicts a method for wireless communications.

FIG. 18 shows an example of a method 1800 for wireless communications by a network entity, such as a BS 102 of FIGS. 1 and 3, or a disaggregated base station as discussed with respect to FIG. 2.

Method 1800 begins at step 1805 with providing an indication of a guard period during which the network entity will switch between subband full duplex (SBFD) communications and half duplex (HD) communications in a cell. In some cases, the operations of this step refer to, or may be performed by, circuitry for providing and/or code for providing as described with reference to FIG. 20.

In some aspects, a duration of the guard period is defined in terms of symbols or absolute time units.

In some aspects, the indication indicates the guard period is at least K absolute time units, and the duration of the guard period is an integral number of symbols based on the K absolute time units and a subcarrier spacing (SCS) of a current operating band of the cell.

In some aspects, a duration of the guard period depends on a subcarrier spacing (SCS) of a current operating band of the cell.

In some aspects, a duration of the guard period is based on a reported filter tuning capability of at least one of a transmit filter or a receive filter of the UE.

In some aspects, the indication indicates a maximum reported guard period of a plurality of reported guard periods reported by a plurality of UEs communicating in the cell.

In some aspects, a duration of the guard period is UE-specific.

In some aspects, the switch between SBFD and HD communications occurs: within a slot; or across a boundary between adjacent slots, wherein the guard period includes at least one of a last symbol of an HD slot or a first symbol of an SBFD slot.

Figure 20:
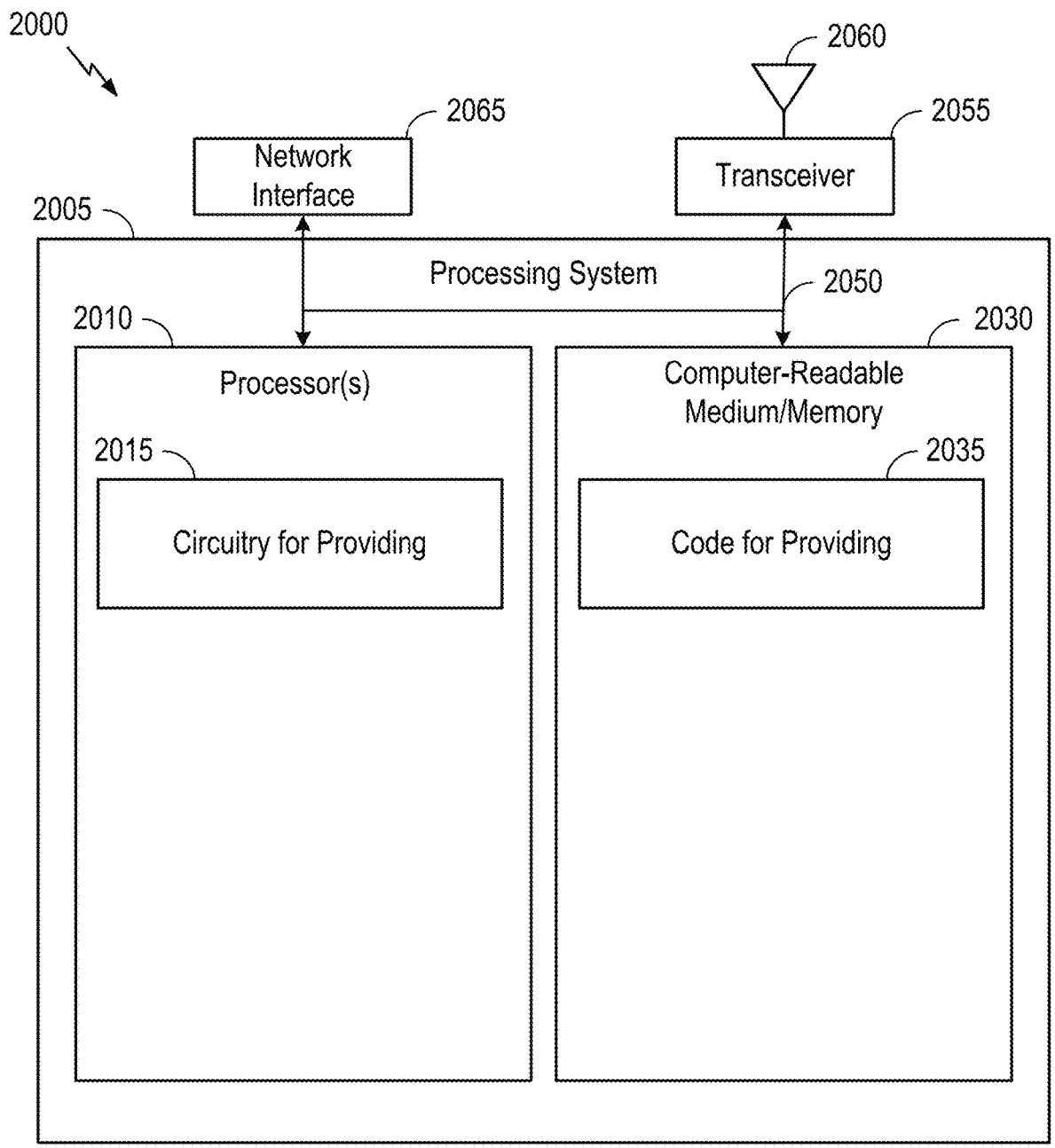
FIG. 20 depicts aspects of an example communications device.

In one aspect, method 1800, or any aspect related to it, may be performed by an apparatus, such as communications device 2000 of FIG. 20, which includes various components operable, configured, or adapted to perform the method 1800. Communications device 2000 is described below in further detail.

Note that FIG. 18 is just one example of a method, and other methods including fewer, additional, or alternative steps are possible consistent with this disclosure.

Example Communications Devices

FIG. 19 depicts aspects of an example communications device 1900. In some aspects, communications device 1900 is a user equipment, such as a UE 104 described above with respect to FIGS. 1 and 3.

The communications device 1900 includes a processing system 1905 coupled to the transceiver 1955 (e.g., a transmitter and/or a receiver). The transceiver 1955 is configured to transmit and receive signals for the communications device 1900 via the antenna 1960, such as the various signals as described herein. The processing system 1905 may be configured to perform processing functions for the communications device 1900, including processing signals received and/or to be transmitted by the communications device 1900.

The processing system 1905 includes one or more processors 1910. In various aspects, the one or more processors 1910 may be representative of one or more of receive processor 358, transmit processor 364, TX MIMO processor 366, and/or controller/processor 380, as described with respect to FIG. 3. The one or more processors 1910 are coupled to a computer-readable medium/memory 1935 via a bus 1960. In certain aspects, the computer-readable medium/memory 1935 is configured to store instructions (e.g., computer-executable code) that when executed by the one or more processors 1910, cause the one or more processors 1910 to perform the method 1700 described with respect to FIG. 17, or any aspect related to it. Note that reference to a processor performing a function of communications device 1900 may include one or more processors 1910 performing that function of communications device 1900.

In the depicted example, computer-readable medium/memory 1935 stores code (e.g., executable instructions), such as code for obtaining 1940, code for performing 1945, code for changing 1950, and code for outputting 1955. Processing of the code for obtaining 1940, code for performing 1945, code for changing 1950, and code for outputting 1955 may cause the communications device 1900 to perform the method 1700 described with respect to FIG. 17, or any aspect related to it.

The one or more processors 1910 include circuitry configured to implement (e.g., execute) the code stored in the computer-readable medium/memory 1935, including circuitry such as circuitry for obtaining 1915, circuitry for performing 1920, circuitry for changing 1925, and circuitry for outputting 1930. Processing circuitry for obtaining 1915, circuitry for performing 1920, circuitry for changing 1925, and circuitry for outputting 1930 may cause the communications device 1900 to perform the method 1700 described with respect to FIG. 17, or any aspect related to it.

Various components of the communications device 1900 may provide means for performing the method 1700 described with respect to FIG. 17, or any aspect related to it. For example, means for transmitting, sending, or outputting for transmission may include transceivers 354 and/or antenna(s) 352 of the UE 104 illustrated in FIG. 3 and/or the circuitry for outputting 1930, the code for outputting 1955, the processing system 1905, the transceiver 1965, and the antenna 1970 of the communications device 1900 in FIG. 19. Means for receiving or obtaining may include transceivers 354 and/or antenna(s) 352 of the UE 104 illustrated in FIG. 3 and/or the circuitry for obtaining 1915, the code for obtaining 1940, the processing system 1905, the transceiver 1965, and the antenna 1970 of the communications device 1900 in FIG. 19. Means for performing may include receive processor 358, controller/processor 380, and/or transmit processor 364 of the UE 104 illustrated in FIG. 3 and/or the circuitry for performing 1920, the code for performing 1945, the processing system 1905, and the transceiver 1965 of the communications device 1900 in FIG. 19. Means for changing may include transceivers 354, receive processor 358, controller/processor 380, and/or transmit processor 364 of the UE 104 illustrated in FIG. 3 and/or the circuitry for changing 1925, the code for changing 1950, the processing system 1905, and the transceiver 1965 of the communications device 1900 in FIG. 19.

FIG. 20 depicts aspects of an example communications device 2000. In some aspects, communications device 2000 is a network entity, such as a BS 102 of FIGS. 1 and 3, or a disaggregated base station as discussed with respect to FIG. 2.

The communications device 2000 includes a processing system 2005 coupled to the transceiver 2055 (e.g., a transmitter and/or a receiver) and/or a network interface 2065. The transceiver 2055 is configured to transmit and receive signals for the communications device 2000 via the antenna 2060, such as the various signals as described herein. The network interface 2065 is configured to obtain and send signals for the communications device 2000 via communication link(s), such as a backhaul link, midhaul link, and/or fronthaul link as described herein, such as with respect to FIG. 2. The processing system 2005 may be configured to perform processing functions for the communications device 2000, including processing signals received and/or to be transmitted by the communications device 2000.

The processing system 2005 includes one or more processors 2010. In various aspects, one or more processors 2010 may be representative of one or more of receive processor 338, transmit processor 320, TX MIMO processor 330, and/or controller/processor 340, as described with respect to FIG. 3. The one or more processors 2010 are coupled to a computer-readable medium/memory 2030 via a bus 2050. In certain aspects, the computer-readable medium/memory 2030 is configured to store instructions (e.g., computer-executable code) that when executed by the one or more processors 2010, cause the one or more processors 2010 to perform the method 1800 described with respect to FIG. 18, or any aspect related to it. Note that reference to a processor of communications device 2000 performing a function may include one or more processors 2010 of communications device 2000 performing that function.

In the depicted example, the computer-readable medium/memory 2030 stores code (e.g., executable instructions), such as code for providing 2035. Processing of the code for providing 2035 may cause the communications device 2000 to perform the method 1800 described with respect to FIG. 18, or any aspect related to it.

The one or more processors 2010 include circuitry configured to implement (e.g., execute) the code stored in the computer-readable medium/memory 2030, including circuitry such as circuitry for providing 2015. Processing with circuitry for providing 2015 may cause the communications device 2000 to perform the method 1800 as described with respect to FIG. 18, or any aspect related to it.

Various components of the communications device 2000 may provide means for performing the method 1800 as described with respect to FIG. 18, or any aspect related to it. Means for transmitting, sending, or outputting for transmission may include transceivers 332, and/or antenna(s) 334 of the BS 102 illustrated in FIG. 3 and/or the transceiver 2055 and the antenna 2060 of the communications device 2000 in FIG. 20. Means for receiving or obtaining may include transceivers 332 and/or antenna(s) 334 of the BS 102 illustrated in FIG. 3 and/or the transceiver 2055 and the antenna 2060 of the communications device 2000 in FIG. 20. Means for providing may include controller/processor 340, transmit processor 320, transceivers 332, and/or antenna(s) 334 of the BS 102 illustrated in FIG. 3 and/or the circuitry for providing 2015, the code for providing 2035, and the processing system 2005 of the communications device 2000 in FIG. 20. Means for communicating may include transceivers 332, and/or antenna(s) 334 of the BS 102 illustrated in FIG. 3 and/or the circuitry for communicating 2020, the code for communicating 2040, the processing system 2005, the transceiver 2055, and the antenna 2060 of the communications device 2000 in FIG. 20

Example Clauses

Implementation examples are described in the following numbered clauses:

Clause 1: A method for wireless communications at a user equipment (UE), comprising: obtaining an indication of a guard period during which a cell in which the UE is communicating will switch between subband full duplex (SBFD) communications and half duplex (HD) communications; and performing one or more actions during the guard period, in accordance with the indication.

Clause 2: The method of clause 1, wherein a duration of the guard period is defined in terms of symbols or absolute time units.

Clause 3: The method of any of clauses 1-2, wherein the indication indicates the guard period is at least K absolute time units, and the duration of the guard period is an integral number of symbols based on the K absolute time units and a subcarrier spacing (SCS) of a current operating band of the cell.

Clause 4: The method of any of clauses 1-3, wherein a duration of the guard period depends on a subcarrier spacing (SCS) of a current operating band of the cell.

Clause 5: The method of any of clauses 1-4, wherein the indication of the guard period is obtained from a network entity supporting the cell.

Clause 6: The method of any of clauses 1-5, wherein a duration of the guard period is based on a reported filter tuning capability of at least one of a transmit filter or a receive filter.

Clause 7: The method of any of clauses 1-6, wherein the indication indicates a maximum reported guard period of a plurality of reported guard periods reported by a plurality of UEs communicating in the cell.

Clause 8: The method of any of clauses 1-7, wherein a duration of the guard period is UE-specific.

Clause 9: The method of any of clauses 1-8, wherein the switch between SBFD and HD communications occurs: within a slot; or across a boundary between adjacent slots, wherein the guard period includes at least one of a last symbol of an HD slot or a first symbol of an SBFD slot.

Clause 10: The method of any of clauses 1-9, wherein the one or more actions comprise masking samples within the guard period.

Clause 11: The method of any of clauses 1-10, wherein the one or more actions comprise: changing from obtaining a first signal on a legacy time-domain duplex (TDD) band to outputting a second signal for transmission on a subband, the guard period being based on at least one of a time to retune a transmit filter involved in outputting the second signal or a time to change from obtaining on the legacy TDD band to outputting for transmission on the subband.

Clause 12: The method of any of clauses 1-11, wherein the one or more actions comprise: changing from obtaining a first signal on a legacy time-domain duplex (TDD) band to obtaining a second signal on at least one subband, the guard period being based on a time to retune a receive filter involved in obtaining the second signal.

Clause 13: The method of any of clauses 1-12, wherein the one or more actions comprise: changing from outputting a first signal for transmission on a legacy time-domain duplex (TDD) band to obtaining a second signal on at least one subband, the guard period being based on a time to retune a receive filter involved in obtaining the second signal.

Clause 14: The method of any of clauses 1-13, wherein the one or more actions comprise: changing from outputting a first signal for transmission on a legacy time-domain duplex (TDD) band to outputting a second signal for transmission on a subband, the guard period being based on at least one of a timing advance (TA) change latency or a time to retune a transmit filter involved in outputting the second signal for transmission.

Clause 15: The method of any of clauses 1-14, wherein the one or more actions comprise: changing from outputting a first signal for transmission on a subband to obtaining a second signal on a legacy time-domain duplex (TDD) band, the guard period being based on a time to retune a receive filter involved in obtaining the second signal.

Clause 16: The method of any of clauses 1-15, wherein the one or more actions comprise: changing from obtaining a first signal on at least one subband to obtaining a second signal on a legacy time-domain duplex (TDD) band, the guard period being based on a time to retune a receive filter involved in obtaining the second signal.

Clause 17: The method of any of clauses 1-16, wherein the one or more actions comprise: changing from obtaining a first signal on at least one subband to outputting a second signal for transmission on a legacy time-domain duplex (TDD) band, the guard period being based on at least one of a time to retune a transmit filter involved in outputting the second signal for transmission or a time for the UE to change from obtaining the first signal on the at least one subband to outputting the second signal for transmission on the legacy TDD band.

Clause 18: The method of any of clauses 1-17, wherein the one or more actions comprise: changing from outputting a first signal for transmission on a subband to outputting a second signal for transmission on a legacy time-domain duplex (TDD) band, the guard period being based on at least one of a timing advance (TA) change latency or a time to retune a transmit filter involved in outputting the second signal for transmission.

Clause 19: The method of any of clauses 1-18, further comprising: outputting for transmission at least one of a transmit filter tuning capability or a receive filter tuning capability, wherein the guard period is based on at least one of the transmit filter tuning capability or the receive filter tuning capability.

Clause 20: The method of any of clauses 1-19, wherein the guard period includes at least a portion of a downlink symbol, an uplink symbol, a flexible symbol, or a special symbol.

Clause 21: A method for wireless communications at a network entity, comprising: providing an indication of a guard period during which the network entity will switch between subband full duplex (SBFD) communications and half duplex (HD) communications in a cell.

Clause 22: The method of clause 21, wherein a duration of the guard period is defined in terms of symbols or absolute time units.

Clause 23: The method of any of clauses 21-22, wherein the indication indicates the guard period is at least K absolute time units, and the duration of the guard period is an integral number of symbols based on the K absolute time units and a subcarrier spacing (SCS) of a current operating band of the cell.

Clause 24: The method of any of clauses 21-23, wherein a duration of the guard period depends on a subcarrier spacing (SCS) of a current operating band of the cell.

Clause 25: The method of any of clauses 21-24, wherein providing the indication of the guard period comprises providing the indication of the guard period to a UE.

Clause 26: The method of any of clauses 21-25, wherein a duration of the guard period is based on a reported filter tuning capability of at least one of a transmit filter or a receive filter.

Clause 27: The method of any of clauses 21-26, wherein the indication indicates a maximum reported guard period of a plurality of reported guard periods reported by a plurality of UEs communicating in the cell.

Clause 28: The method of any of clauses 21-27, wherein a duration of the guard period is UE-specific.

Clause 29: The method of any of clauses 21-28, wherein the switch between SBFD and HD communications occurs: within a slot; or across a boundary between adjacent slots, wherein the guard period includes at least one of a last symbol of an HD slot or a first symbol of an SBFD slot.

Clause 30: An apparatus, comprising: a memory comprising executable instructions; and a processor configured to execute the executable instructions and cause the apparatus to perform a method in accordance with any one of Clauses 1-29.

Clause 31: An apparatus, comprising means for performing a method in accordance with any one of Clauses 1-29.

Clause 32: A non-transitory computer-readable medium comprising executable instructions that, when executed by a processor of an apparatus, cause the apparatus to perform a method in accordance with any one of Clauses 1-29.

Clause 33: A computer program product embodied on a computer-readable storage medium comprising code for performing a method in accordance with any one of Clauses 1-29.

Clause 34: A user equipment (UE), comprising: at least one transceiver; a memory comprising executable instructions; and a processor configured to execute the executable instructions and cause the UE to perform a method in accordance with any one of Clauses 1-20, wherein the at least one transceiver is configured to receive the indication.

Clause 35: A network entity, comprising: at least one transceiver; a memory comprising executable instructions; and a processor configured to execute the executable instructions and cause the network entity to perform a method in accordance with any one of Clauses 21-29; wherein the at least one transceiver is configured to transmit the indication.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications, comprising:
   at least one memory comprising computer-executable instructions; and
   at least one processor configured to execute the computer-executable instructions to cause the apparatus to:
      obtain an indication of a guard period during which a cell in which the apparatus is communicating will switch between subband full duplex (SBFD) communications and half duplex (HD) communications, wherein the indication indicates a maximum period of a plurality of guard periods reported by a plurality of UEs communicating in the cell; and
      perform one or more actions during the guard period, in accordance with the indication.

2. The apparatus of claim 1, wherein a duration of the guard period is defined in terms of symbols or absolute time units.

3. The apparatus of claim 1, wherein the indication further indicates the guard period is at least K absolute time units, and a duration of the guard period is an integral number of symbols based on the K absolute time units and a subcarrier spacing (SCS) of a current operating band of the cell.

4. The apparatus of claim 1, wherein a duration of the guard period depends on a subcarrier spacing (SCS) of a current operating band of the cell.

5. The apparatus of claim 1, wherein the indication of the guard period is obtained from a network entity supporting the cell.

6. The apparatus of claim 1, wherein a duration of the guard period is based on a reported filter tuning capability of at least one of a transmit filter or a receive filter.

7. The apparatus of claim 1, wherein a duration of the guard period is UE-specific.

8. The apparatus of claim 1, wherein the switch between SBFD and HD communications occurs:
   within a slot; or
   across a boundary between adjacent slots, wherein the guard period includes at least one of a last symbol of an HD slot or a first symbol of an SBFD slot.

9. The apparatus of claim 1, wherein, to perform the one or more actions, the at least one process is configured to cause the apparatus to mask samples of a signal within the guard period.

10. The apparatus of claim 1, wherein the one or more actions comprise:
   changing from obtaining a first signal on a legacy time-domain duplex (TDD) band to outputting a second signal for transmission on a subband, the guard period being based on at least one of a time to retune a transmit filter involved in outputting the second signal or a time to change from obtaining on the legacy TDD band to outputting for transmission on the subband.

11. The apparatus of claim 1, wherein the one or more actions comprise:
   changing from obtaining a first signal on a legacy time-domain duplex (TDD) band to obtaining a second signal on at least one subband, the guard period being based on a time to retune a receive filter involved in obtaining the second signal.

12. The apparatus of claim 1, wherein the one or more actions comprise:
   changing from outputting a first signal for transmission on a legacy time-domain duplex (TDD) band to obtaining a second signal on at least one subband, the guard period being based on a time to retune a receive filter involved in obtaining the second signal.

13. The apparatus of claim 1, wherein the one or more actions comprise:
   changing from outputting a first signal for transmission on a legacy time-domain duplex (TDD) band to outputting a second signal for transmission on a subband, the guard period being based on at least one of a timing advance (TA) change latency or a time to retune a transmit filter involved in outputting the second signal for transmission.

14. The apparatus of claim 1, wherein the one or more actions comprise:
   changing from outputting a first signal for transmission on a subband to obtaining a second signal on a legacy time-domain duplex (TDD) band, the guard period being based on a time to retune a receive filter involved in obtaining the second signal.

15. The apparatus of claim 1, wherein the one or more actions comprise:
   changing from obtaining a first signal on at least one subband to obtaining a second signal on a legacy time-domain duplex (TDD) band, the guard period being based on a time to retune a receive filter involved in obtaining the second signal.

16. The apparatus of claim 1, wherein the one or more actions comprise:
   changing from obtaining a first signal on at least one subband to outputting a second signal for transmission on a legacy time-domain duplex (TDD) band, the guard period being based on at least one of a time to retune a transmit filter involved in outputting the second signal for transmission or a time for the apparatus to change from obtaining the first signal on the at least one subband to outputting the second signal for transmission on the legacy TDD band.

17. The apparatus of claim 1, wherein the one or more actions comprise:
   changing from outputting a first signal for transmission on a subband to outputting a second signal for transmission on a legacy time-domain duplex (TDD) band, the guard period being based on at least one of a timing advance (TA) change latency or a time to retune a transmit filter involved in outputting the second signal for transmission.

18. The apparatus of claim 1, wherein the at least one processor is configured to execute the computer-executable instructions to further cause the apparatus to:
   output for transmission at least one of a transmit filter tuning capability or a receive filter tuning capability, wherein the guard period is based on at least one of the transmit filter tuning capability or the receive filter tuning capability.

19. The apparatus of claim 1, wherein the guard period includes at least a portion of a downlink symbol, an uplink symbol, a flexible symbol, or a special symbol.

20. The apparatus of claim 1, further comprising at least one transceiver configured to receive the indication, wherein the apparatus is configured as a user equipment.

21. An apparatus for wireless communications, comprising:
- at least one memory comprising computer-executable instructions; and
- at least one processor configured to execute the computer-executable instructions to cause the apparatus to:
  - provide an indication of a guard period during which the apparatus will switch between subband full duplex (SBFD) communications and half duplex (HD) communications in a cell, wherein the indication indicates a maximum guard period of a plurality of guard periods reported by a plurality of UEs communicating in the cell.

22. The apparatus of claim 21, wherein a duration of the guard period is defined in terms of symbols or absolute time units.

23. The apparatus of claim 21, wherein the indication further indicates the guard period is at least K absolute time units, and a duration of the guard period is an integral number of symbols based on the K absolute time units and a subcarrier spacing (SCS) of a current operating band of the cell.

24. The apparatus of claim 21, wherein a duration of the guard period depends on a subcarrier spacing (SCS) of a current operating band of the cell.

25. The apparatus of claim 21, wherein a duration of the guard period is based on a reported filter tuning capability of at least one of a transmit filter or a receive filter.

26. The apparatus of claim 21, wherein a duration of the guard period is UE-specific.

27. The apparatus of claim 21, wherein the switch between SBFD and HD communications occurs:
- within a slot; or
- across a boundary between adjacent slots, wherein the guard period includes at least one of a last symbol of an HD slot or a first symbol of an SBFD slot.

28. The apparatus of claim 21, further comprising at least one transceiver configured to transmit the indication, wherein the apparatus is configured as a network entity.

29. An apparatus for wireless communications, comprising:
- at least one memory comprising computer-executable instructions; and
- at least one processor configured to execute the computer-executable instructions to cause the apparatus to:
  - obtain an indication of a guard period during which a cell in which the apparatus is communicating will switch between subband full duplex (SBFD) communications and half duplex (HD) communications, wherein a duration of the guard period is based on a filter tuning capability of at least one of a transmit filter or a receive filter; and
  - perform one or more actions during the guard period, in accordance with the indication.

30. The apparatus of claim 29, wherein the at least one processor is configured to execute the computer-executable instructions to further cause the apparatus to output, for transmission, at least one of the transmit filter tuning capability or the receive filter tuning capability.

31. The apparatus of claim 29, further comprising at least one transceiver configured to receive the indication, wherein the apparatus is configured as a user equipment.

32. An apparatus for wireless communications, comprising:
- at least one memory comprising computer-executable instructions; and
- at least one processor configured to execute the computer-executable instructions to cause the apparatus to:
  - obtain an indication of a guard period during which a cell in which the apparatus is communicating will switch between subband full duplex (SBFD) communications and half duplex (HD) communications; and
  - perform one or more actions during the guard period, in accordance with the indication, wherein, to perform the one or more actions, the at least one processor is configured to cause the apparatus to mask samples of a signal within the guard period.

33. The apparatus of claim 32, further comprising at least one transceiver configured to receive the indication, wherein the apparatus is configured as a user equipment.

34. An apparatus for wireless communications, comprising:
- at least one memory comprising computer-executable instructions; and
- at least one processor configured to execute the computer-executable instructions to cause the apparatus to:
  - provide an indication of a guard period during which the apparatus will switch between subband full duplex (SBFD) communications and half duplex (HD) communications in a cell, wherein a duration of the guard period is based on a reported filter tuning capability of at least one of a transmit filter or a receive filter.

35. The apparatus of claim 34, further comprising at least one transceiver configured to receive the indication, wherein the apparatus is configured as a network entity.

* * * * *